United States Patent [19]

Dummermuth et al.

[11] 4,165,534
[45] Aug. 21, 1979

[54] DIGITAL CONTROL SYSTEM WITH BOOLEAN PROCESSOR

[75] Inventors: Ernst Dummermuth, Chesterland; Raymond A. Grudowski, South Euclid; Valdis Grants, Lyndhurst; Otomar Schmidt, North Olmstead, all of Ohio

[73] Assignee: Allen-Bradley Company, Milwaukee, Wis.

[21] Appl. No.: 911,520

[22] Filed: Jun. 1, 1978

Related U.S. Application Data

[63] Continuation of Ser. No. 790,251, Apr. 25, 1977, abandoned.

[51] Int. Cl.$^2$ .................... G05B 11/01; G05B 19/02; G06F 9/06
[52] U.S. Cl. .................... 364/900; 364/104
[58] Field of Search ... 364/900 MS File, 200 MS File, 364/104, 107

[56] References Cited

U.S. PATENT DOCUMENTS

| | | | |
|---|---|---|---|
| 3,810,104 | 5/1974 | Markley | 364/900 |
| 3,944,984 | 3/1976 | Morley | 364/900 |
| 4,029,950 | 6/1977 | Haga | 364/194 |
| 4,034,354 | 7/1977 | Simmons | 364/900 X |
| 4,038,533 | 7/1977 | Dummermuth et al. | 364/900 |
| 4,064,395 | 12/1977 | Schubeler et al. | 364/900 X |
| 4,070,702 | 1/1978 | Grants et al. | 364/900 |
| 4,078,259 | 3/1978 | Soulsby et al. | 364/900 |
| 4,079,235 | 3/1978 | Froyd et al. | 364/107 |
| 4,079,452 | 3/1978 | Larson et al. | 364/200 |
| 4,092,730 | 5/1978 | Burkett et al. | 364/900 |
| 4,107,785 | 8/1978 | Seipp | 364/900 |

OTHER PUBLICATIONS

Andreiev, "Programmable Logic Controllers" in *Control Engineering*, Sep. 1972, pp. 45–47.
Symmes, "Programmable Controllers and Computers Complement Each Other for More Effective Industrial Control" in *Computer Design*, Sep. 1973, pp. 54, 56, 58 and 60.
Kompass, "Multiprocessor Concept Leads to PLC Hierarchies" in *Control Engineering*, Jan. 1976, pp. 46–47.

*Primary Examiner*—Melvin B. Chapnick
*Attorney, Agent, or Firm*—Quarles & Brady

[57] ABSTRACT

An eight-bit microprocessor sequentially reads controller type instructions from a memory and applies the operation codes of selected ones of the instructions to a hardwired Boolean processor. The microprocessor also couples status words between an I/O image table stored in the memory and the I/O interface racks which connect the programmable controller to the machine being controlled. In general, those controller type instructions which are word oriented are executed by the microprocessor and those which are single-bit oriented are executed by the Boolean processor. The Boolean processor is operable in combination with the microprocessor to examine selected status bits in the I/O image table and to set selected status bits therein to a logic state which is determined in part by the state of the examined status bits.

10 Claims, 8 Drawing Figures

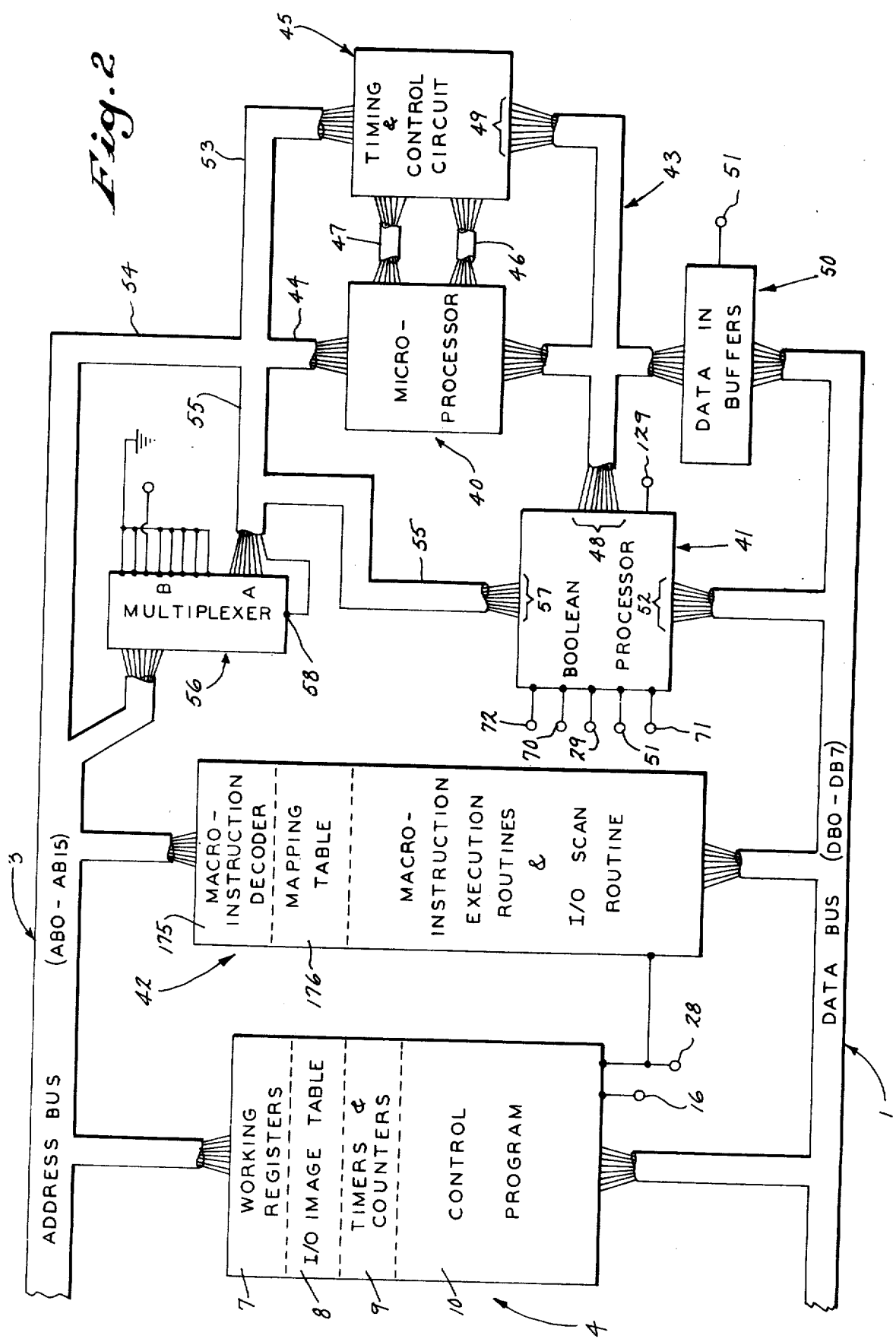

Fig.5
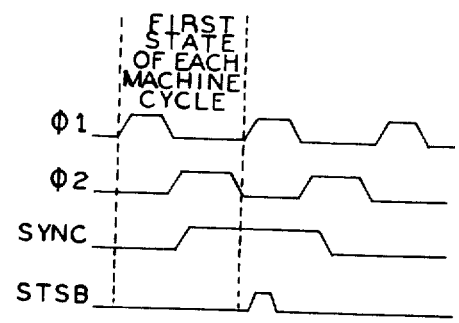
Fig.6
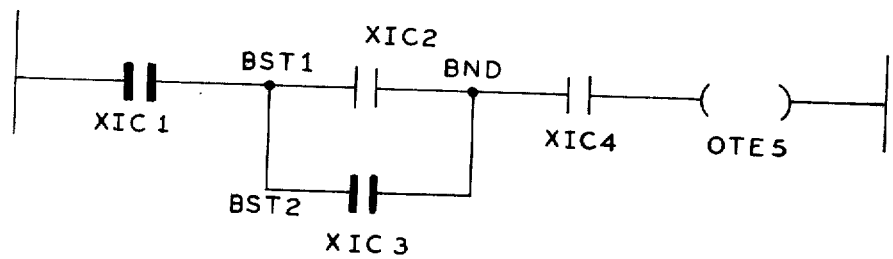
Fig.7
| BIT NO. | 7 | 6 | 5 | 4 | 3 | 2 | 1 | 0 |
|---|---|---|---|---|---|---|---|---|
| ACCUMULATOR CONTENTS | TIMER ON | | TIMED OUT | | BCD DIGIT | | | |
| | BCD DIGIT | | | | BCD DIGIT | | | |
| PRESET VALUE CONTENTS | | | | | BCD DIGIT | | | |
| | BCD DIGIT | | | | BCD DIGIT | | | |

… 
DIGITAL CONTROL SYSTEM WITH BOOLEAN PROCESSOR

This is a continuation of application Ser. No. 790,251, filed Apr. 25, 1977, now abandoned.

BACKGROUND OF THE INVENTION

The field of the invention is digital control systems such as programmable controllers disclosed in U.S. Pat. Nos. 3,942,158 and 3,810,118.

Programmable controllers are typically connected to industrial equipment such as assembly lines and machine tools to sequentially operate the equipment in accordance with a stored control program. In programmable controllers such as those disclosed in the above cited patents, for example, the control program is stored in a memory and includes instructions which are read out in rapid sequence to examine the condition of selected sensing devices on the controlled equipment and instructions which energize or deenergize selected operating devices on the controlled equipment contingent upon the status of one or more of the examined sensing devices.

The processor in a programmable controller is designed to rapidly execute programmable controller type instructions which call for the manipulation of single-bit input data and the control of single-bit output data. The length of the control program, and hence the complexity of the system to be controlled, must be limited to insure that the entire control program can be executed, or scanned, within a set time. Such time limits are required to insure that the programmable controller will provide virtually instantaneous response to any change in the status of sensing devices on the controlled system. Therefore, the speed with which a controller processor can execute programmable controller instructions has a direct bearing on the size of the machine or process which it can effectively control.

Although the vast majority of programmable controllers presently in use are comprised of discrete components, a number of small programmable controllers have been introduced in recent years which employ a microprocessor. Heretofore such microprocessor based programmable controllers have been limited in size by the speed with which the microprocessor can execute programmable controller type expressions, and hence, the speed with which it can scan the control program. To assist the microprocessor in carrying out the numerous single-bit calculations necessary to execute a control program, hardware such as data selectors and addressable latches have been employed to "convert" the word-oriented microprocessor to a single-bit processor. Such hardware eliminates the need for numerous shifting and masking operations on input and output data and hence it shortens the execution time to some extent.

Not only should a programmable controller processor be able to execute Boolean expressions rapidly, but it also should be able to execute programmable controller type instructions. Such instructions have become quite standardized in the industry in terms of the functions they perform. They may be directly associated with elements of a ladder diagram and are, therefore, easily understood by control engineers who use programmable controllers. Program panels such as those disclosed in U.S. Pat. Nos. 3,798,612 and 3,813,649 and in U.S. Pat. No. 4,070,702 have also been developed to assist the user in developing and editing a control program comprised of programmable controller type instructions. Such program panels account to a great extent for the rapidly increasing popularity of programmable controllers and any new controller processor should be compatible with them. In other words, the controller processor should be capable of directly executing programmable controller type instructions.

As indicated above, microprocessors are word oriented calculating devices which have been developed to provide the functions normally associated with a general purpose digital computer. As such they have their own unique instruction set, or machine language, which is designed to efficiently carry out these computer type functions. To develop a control program for prior programmable controllers which employ a microprocessor the user first develops a control program comprised of programmable controller type instructions and then converts, or assembles, that program into the machine language of the particular microprocessor being used in the controller processor. Such assembly requires a separate step in the programming process and requires the use of a separate general purpose digital computer.

SUMMARY OF THE INVENTION

The present invention relates to a digital control system which employs a word-oriented processor to carry out many of its functions and a single-bit Boolean processor to carry out other functions. More specifically, the present invention includes a memory which stores a control program comprised of a series of programmable controller type instructions, a processor which connects to the memory through an address bus and a data bus and is operable to sequentially read the controller instructions out of the memory, and a Boolean processor which connects to the data bus and is coupled to the processor, the Boolean processor being enabled by the processor to execute selected controller instructions read from the memory.

The processor performs the data handling and arithmetic functions of the digital control system. Such functions include the manipulation of multi-bit words for which the processor is well suited and includes the transfer of data to and from the memory and the transfer of data between the memory and an I/O interface rack which connects the controller to the system being controlled. On the other hand, controller instructions which involve single-bit calculations are recognized by the Boolean processor which is enabled by the processor to carry out the indicated function. The Boolean processor is capable of executing an entire Boolean expression which is represented by a set of programmable controller type instructions read from the memory.

A general object of the invention is to realize the economic advantages of applying microprocessor technology to a programmable controller system without sacrificing performance of that system. By employing a separate Boolean processor to assist the microprocessor in executing the control program, the speed at which the control program can be executed is maintained. Also, by employing an I/O image table the speed at which the control program is executed may be maintained at a high level without incurring excessively high data rates in the I/O interface circuitry.

Another object of the present invention is to provide a programmable controller which may be programmed using conventional programmable controller type instructions and which does not require a separate assembly of the resulting control program into microprocessor machine instructions. The Boolean processor decodes and responds to certain of the controller type instructions and others are mapped into control instruction execution routines which are stored in a read-only memory. Each control instruction execution routine is comprised of a set of microprocessor machine instructions, which when executed, carry out the function indicated by its corresponding controller type instruction.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is therefore made to the claims herein for interpreting the scope of the invention.

BRIEF DESCRIPTION OF THE DRAWINGS

FIG. 2 is an electrical block diagram of the controller processor and random access memory which form part of the controller of FIG. 1, FIGS. 3a and 3b are electrical schematic diagrams of the Boolean processor which forms part of the controller processor of FIG. 2, FIG. 5 is a timing diagram, FIG. 6 is an example ladder diagram employed to describe the operation of the Boolean processor, and FIG. 7 is a schematic representation of a portion of memory employed to describe the timer function.

DESCRIPTION OF THE PREFERRED EMBODIMENT

Figure 1:
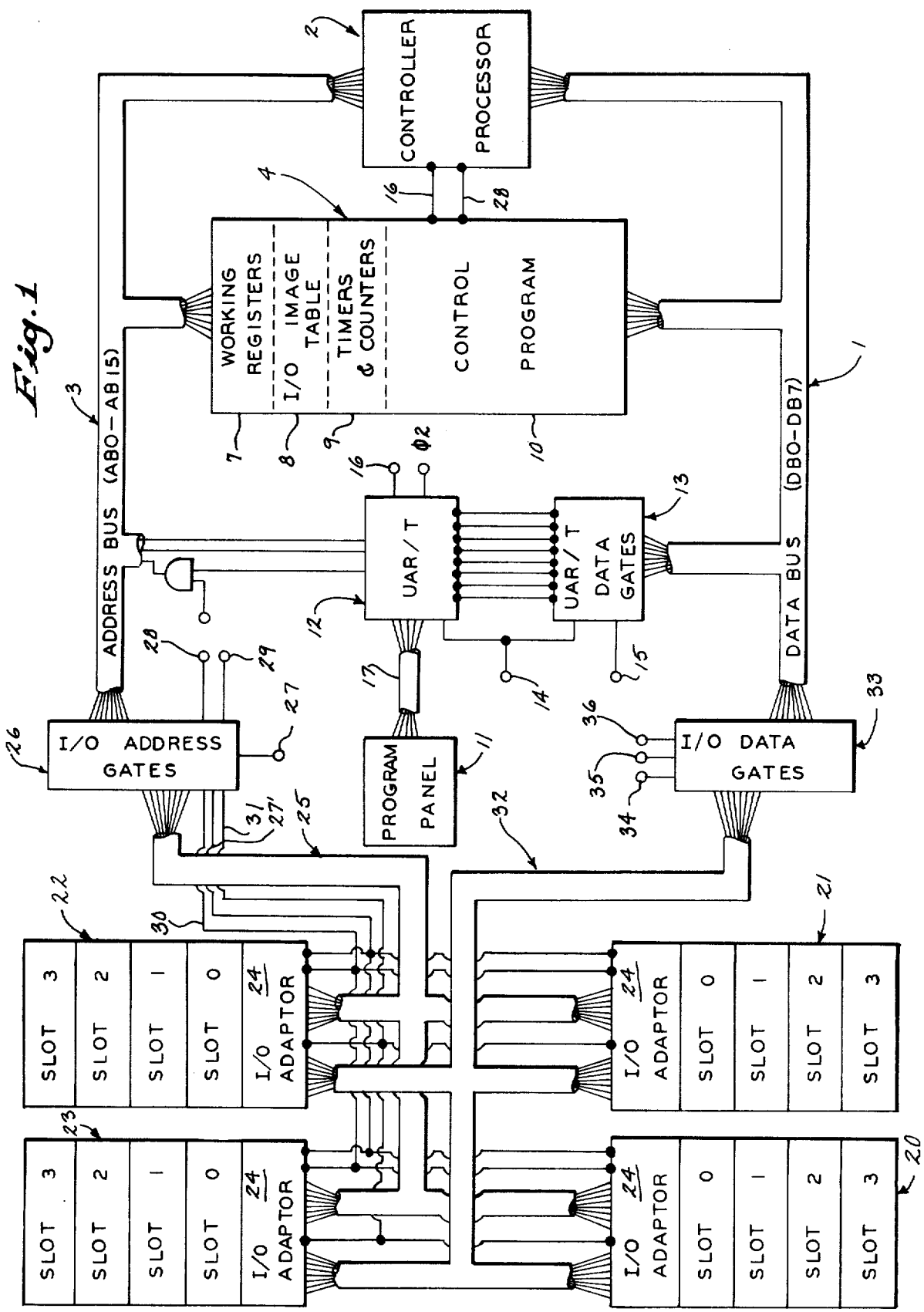
FIG. 1 is an electrical block diagram of a programmable controller which employs the present invention.

Referring to FIG. 1, the programmable controller is structured around an eight-bit bidirectional data bus 1 and includes a controller processor 2 which directs the flow of data thereon by means of control lines and a sixteen-bit address bus 3. A random access memory (RAM) 4 connects to both the data bus 1 and the address bus 3 and an eight-bit data word may be written into an addressed line or read out of an addressed line of the memory 4 in response to control signals applied to "data out strobe" and "MEMR" control lines 16 and 28. The RAM 4 may include anywhere from 2K to 8K lines of memory depending on the size of the control program to be stored. The first 256 lines consist of working registers 7, an I/O image table 8 and a timers and counters storage 9. The remainder of the RAM 4 stores the control program 10 which is comprised of a large number of programmable controller type instructions.

The control program 10 is loaded into the memory 4 and edited by means of a program panel 11 which couples to the data bus 1 through a universal asynchronous receiver/transmitter (UAR/T) 12 and a set of bidirectional data gates 13. Data is received from the program panel 11 serially through a cable 17 and the received eight-bit word is gated onto the data bus 1 when the UAR/T 12 is addressed through the address bus 3 and a logic high is applied to the UAR/T 12 and data gates 13 through an "enable SD" control line 14. Data is gated from the data bus 1 to the UAR/T 12 when a logic high voltage is applied to the UAR/T data gates 13 through an "out" control line 15 and this data is latched in the UAR/T 12 and serially transmitted to the program panel 11 when the UAR/T 12 is addressed and a logic high voltage is applied to the UAR/T 12 through the "data out strobe" control line 16.

The programmable controller is connected to the machine, or system being controlled, through I/O interface racks 20–23. Each interface rack 20–23 includes an I/O adapter card 24 and up to eight eight-bit input or output cards (not shown in the drawings) that are received in four slots 0–3. That is, each slot 0–3 may include two eight-bit I/O modules, or cards—a low and a high. Each input card contains eight input circuits for receiving digital signals that indicate the status of sensing devices such as limit switches on the machine being controlled, and each output card contains eight output circuits for controlling operating devices on the machine such as motor starters and solenoids. Input and output circuits illustrated in respective U.S. Pat. Nos. 3,643,115 and 3,745,546 may be employed for this purpose although numerous circuits are available to interface with the many types of sensing devices and operating devices which may be encountered in industrial application.

Data is coupled to or from a particular card in one of the I/O interface racks 20–23 by addressing it through a five-bit I/O address bus 25. Two bits select the appropriate I/O interface rack 20–23 and the remaining three bits identify the card being addressed. The I/O adaptor card 24 on each I/O interface rack 20–23 includes means for recognizing when its rack is being addressed (not shown in the drawings) and it includes a three-bit decoder (not shown in the drawings) for enabling the appropriate slot and card. Reference is made to copending patent application Ser. No. 790,590 which is filed on even date herewith and is entitled "Malfunction Detection System For a Microprocessor Based Programmable Controller", for a more detailed description of the I/O adapter cards 24.

As will be explained in detail hereinafter, the I/O address is generated on the address bus 3 (AB0-AB4) by the controller processor 2. It is coupled to the I/O address bus 25 by a set of I/O address gates 26 which are enabled when a logic high voltage is generated on an "I/O SEL" control line 27. In addition to the I/O address, the gates 26 couple a "MEMR" control line 28 and a "WO" control line 29 to each of the interface racks 20–23 through a read line 30 and a write line 31. A strobe line 27' also connects to each rack 20–23 to indicate when an input or output function is to be performed.

Data is coupled between the controller processor 2 and the I/O interface racks 20–23 through an eight-bit I/O data bus 32 and a set of eight I/O data gates 33. When a logic high voltage is generated on the read line 30, eight bits of data are gated onto the I/O data bus 32 by the addressed I/O card and is coupled to the data bus 1 by the I/O data gates 33. Conversely, when a logic high is generated on the write control line 31, an eight-bit output data word is coupled from the controller processor 2, through the I/O data gates 33 and to an addressed output card in one of the I/O interface racks 20–23. The I/O data gates 33 are controlled by a "BE" control line 34 which is driven to a logic high voltage when data is to be outputted to the I/O interface racks 20–23, and a "RLE" control line 35 which is driven high when input data is to be received from an addressed I/O card. A "CL" control line 36 synchronizes the operation of the I/O data gates 33 with that of the controller processor 2.

As will be explained in more detail hereinafter, the control program stored in the RAM 4 is repeatedly executed, or scanned, by the controller processor 2 when in the "run" mode. Each scan through the control program requires less than twenty milliseconds (the exact time depends on the length of the control program 10 and the types of instructions contained therein) and after each such scan, an I/O scan routine is executed to couple data between the I/O interface racks 20-23 and the I/O image table 8 in the RAM 4. The I/O image table stores an input status data word and an output status data word for each I/O card in the interface racks 20-23. Each data word in the I/O image table is thus associated with a specific card in one of the I/O interface racks 20-23. Each input status word is an image of the state of eight sensing devices connected to its associated I/O card and each output status word is an image of the desired state of any operating devices connected to its associated I/O card. If a particular I/O slot contains an input card, the output status word in the I/O image table 8 which corresponds to that slot is meaningless and would be blank. Although this is a somewhat inefficient use of memory space it does allow either input or output cards to be inserted freely in any I/O slot.

The I/O scan is made after each scan, or execution, of the control program 10. The I/O scan is a programmed sequence in which output status words are sequentially coupled from the I/O image table 8 to their associated I/O cards and input status words are sequentially coupled from the I/O cards to their associated memory locations in the I/O image table 8. The I/O scan is performed every twenty milliseconds or less and thus the I/O image table 8 is kept up to date with changing conditions on the machine or process being controlled. As will become apparent from the discussion to follow, the controller processor 2 operates on data in the I/O image table 8 rather than data received directly from the I/O interface racks 20-23. This allows the processor to operate at maximum speed to execute the control program 10 in a minimum amount of time while at the same time minimizing the data rates in the I/O data bus 32 and the I/O address bus 25. The latter consideration is important since lower data rates allow the use of more effective noise immunity circuits which are so necessary in an industrial environment.

Figure 3A:
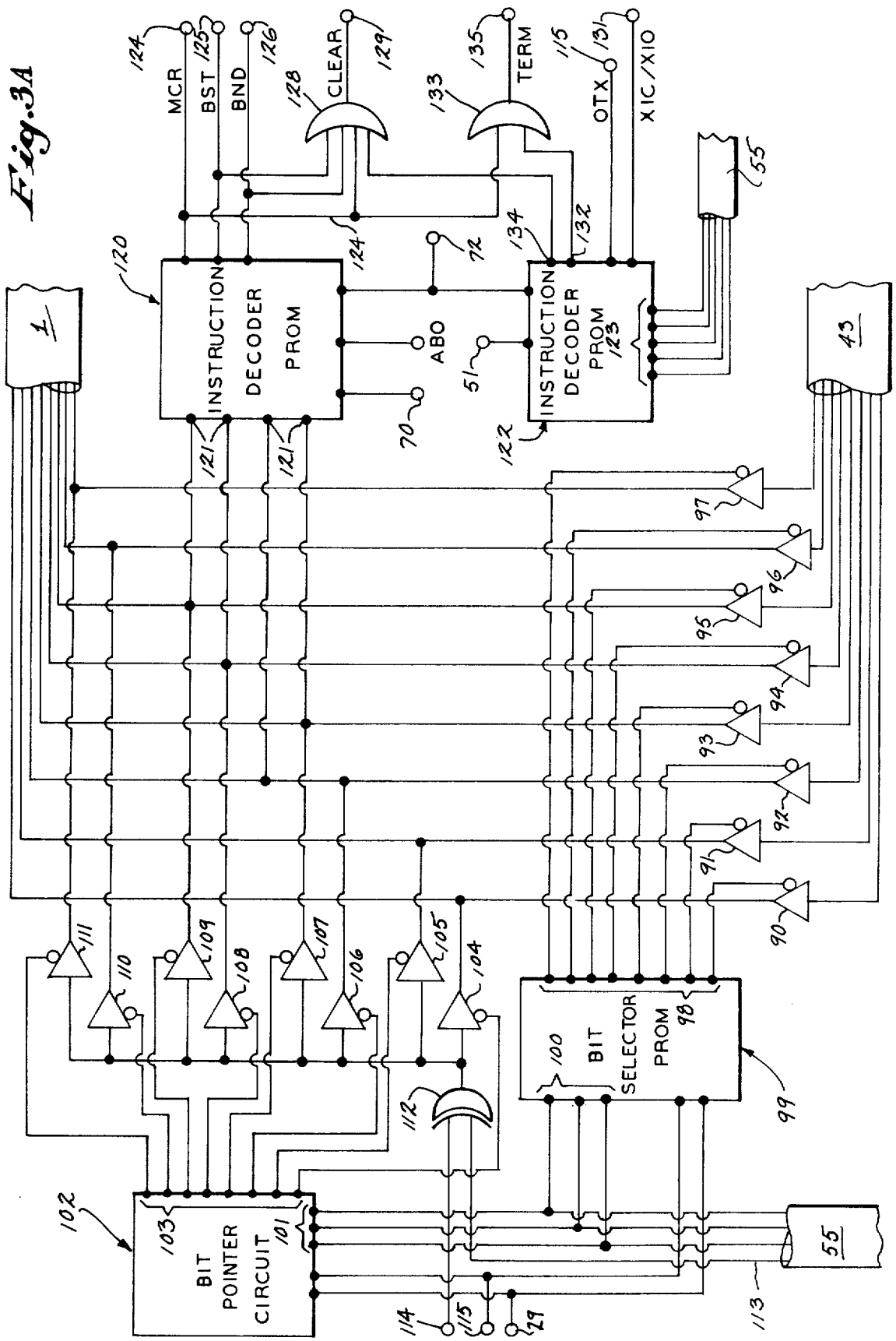
Figure 3B:
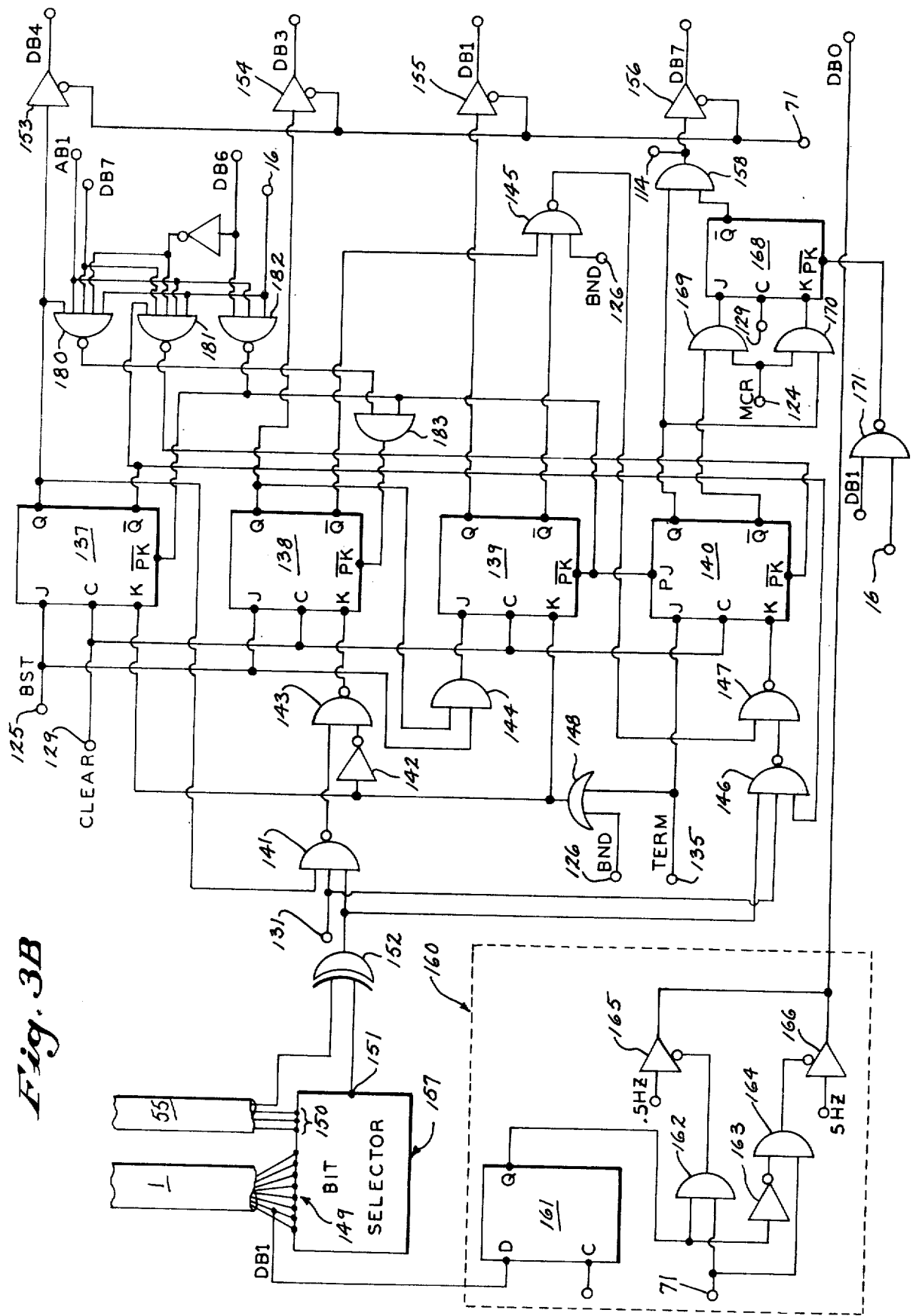

Referring particularly to FIG. 2, the controller processor 2 is comprised of a programmed microprocessor 40, a hardwired Boolean processor 41 and supporting circuitry. The programs for the microprocessor are stored in a read-only memory (ROM) 42 which stores up to eight thousand machine instructions. The microprocessor 40 is an eight-bit, seventy-two instruction, LSI chip manufactured by the Intel Corporation and sold as the Model 8080. Numerous types of microprocessors are available and reference is made to the publication "Intel 8080 Microcomputer Systems User's Manual," dated September, 1975, for a complete description of the structure, operation and instruction set of the microprocessor 40 employed in the preferred embodiment of the present invention. The Boolean processor 41 is a special purpose hardwired circuit which is illustrated in FIGS. 3a and 3b and which will be described in more detail hereinafter.

The microprocessor 40 transfers data and internal state information on an eight-bit bidirectional, three-state processor data bus 43 (D0-D7). The memories 4 and 42, the program panel 11 and the I/O interface racks 20-23 are addressed by the microprocessor 40 through a sixteen-bit, three-state processor address bus 44. Three timing and control outputs (WR, SYNC and DBIN) eminate from the microprocessor 40 and connect with a timing and control circuit 45 through a bus 46. Four control inputs (READY, RESET, $\phi 1$ and $\phi 2$) connect the timing and control circuit 45 to the microprocessor 40 through a bus 47.

The processor data bus 43 connects to a set of eight inputs 48 on the Boolean processor 41, to eight inputs 49 on the timing and control circuit 45 and to the outputs of eight data in buffer gates 50. The inputs of the data in buffer gates 50 connect to the respective leads DB0-DB7 in the data bus 1 and data is gated from the bus 1 to the microprocessor 40 when a logic high voltage is applied to a "DBIN" control line 51. All data outputted by the microprocessor 40, except for that applied to the timing and control circuit 45, is coupled through the Boolean processor 41 and applied thereby to the data bus 1 at a set of terminals 52.

The processor address bus 44 divides to form a number of branches which connect to programmable controller system elements. A branch 53 formed by leads AB1, AB2, AB13, AB14 and AB15 connects to the timing and control circuit 45, a branch 54 formed by leads AB0-AB7 connects directly to the corresponding leads in the address bus 3, and a third branch 55 formed by leads AB8-AB15 connects to the A inputs on a multiplexer 56 and the inputs 57 on the Boolean processor 41. The lead AB15 in the branch 55 connects to a select terminal on the multiplexer 56, and depending on its logic state, either the leads in the branch 55 are coupled to the leads AB8-AB15 in the address bus 3 or a constant which is applied to the B inputs on the multiplexer 56 is coupled to the address bus 3.

The constant imposed through the multiplexer 56 generates the address $8192_{10}$ (hereinafter referred to as 8K) which is that of the first line in the RAM 4. When this constant is imposed on the address bus 3, the address on the lowest eight bits AB0-AB7 which eminate directly from the microprocessor 40 thus selects one of the first 256 lines in the RAM 4. These lines store the working registers 7, the I/O image table 8 and the timers and counters 9 which are associated with the execution of programmable controller type instructions. As a consequence, when data is to be written into or read from the first 256 lines of the RAM 4, the processor address bus leads AB8-AB14 are free to convey control information through the branch 55 to the Boolean processor 41. As will be described in more detail hereinafter, this information indicates in part the type of programmable controller function which is to be performed by the Boolean processor 41 and it indicates which, if any, bit on the data bus 1 is involved in that function. When a status bit in the I/O image table 8 is to be examined, for example, the address of the memory line which stores that bit is generated on address bus lines AB0-AB7 along with the 8K constant on address bus lines AB8-AB15. Simultaneously, a bit pointer code is coupled to the Boolean processor 41 through the branch 55 to identify which bit on the addressed memory line is to be examined.

Figure 4:
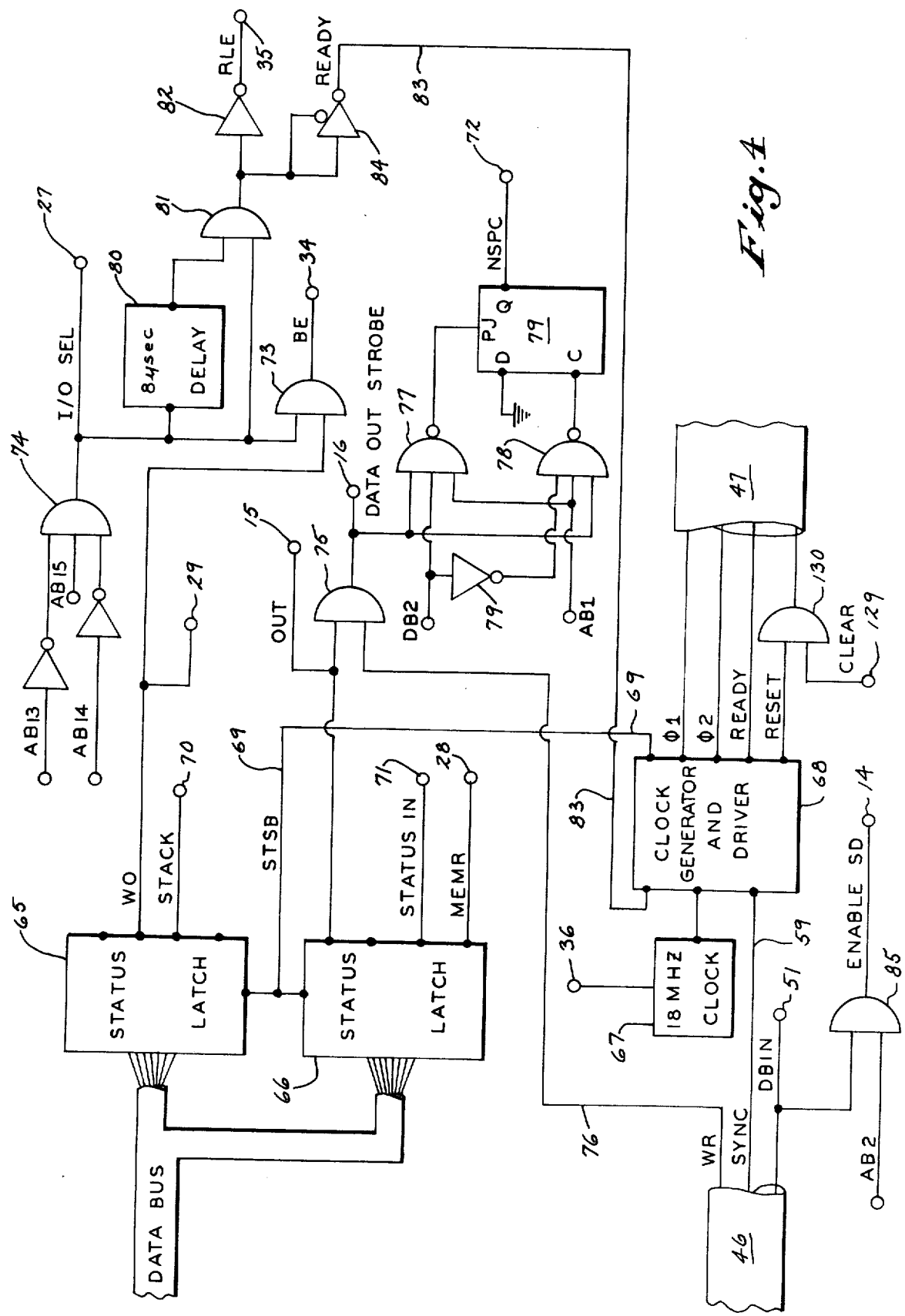
FIG. 4 is an electrical schematic diagram of the timing and control circuit which forms part of the controller processor of FIG. 2.

Referring particularly to FIGS. 2 and 4, the microprocessor 40 controls the various elements of the controller processor 2 and it in turn is controlled by instructions stored in the ROM 42. The microprocessor sequentially fetches such instructions from the ROM 42, stores each in its internal instruction register, and executes it. Each instruction requires from one to five machine cycles and each machine cycle consists of from three to five states. At least one machine cycle is required to fetch an instruction from the ROM 42 and the remaining portion of the instruction cycle is employed to execute the instruction. Some instructions require only a fetch machine cycle while others require additional cycles to read data from the RAM 4, write data into the RAM 4 or receive or transmit data to an I/O device. At the beginning (during the first state) of each machine cycle the microprocessor generates a SYNC control signal to the timing and control circuit 45 through the bus 46. Concurrently, the microprocessor generates a status word on the processor data bus 43 which identifies the nature of the machine cycle in progress. This status word is saved in latches 65 and 66 in the timing and control circuit 45 and is used thereby to develop the control signals which operate the various elements of the controller.

Referring particularly to FIG. 4, the timing and control circuit 45 includes an 18 megahertz clock 67 which connects to the clock input of a clock generator and driver circuit 68 and to the CL control line 36 which operates the I/O data gates 33. The clock generator and driver circuit 68 generates two nonoverlapping clock pulse trains $\phi 1$ and $\phi 2$ which are coupled to the microprocessor 40 through the bus 47. The microprocessor 40 generates its sync signal through the sync control line 59 to the clock generator 68 at the beginning of each machine cycle and the circuit 68 in turn generates a logic high voltage on an "STSB" control line 69 to the enable terminals on the status latches 65 and 66. A timing diagram illustrating the relationship of the $\phi 1$, $\phi 2$, SYNC and STSB signals is shown in FIG. 5.

A number of control signals are derived directly from the status word stored in the latches 65 and 66. These include the WO control signal on the control line 29 which indicates that data is to be outputted to an I/O interface rack 20-23, the OUT control signal on the line 15 which indicates that data is to be outputted to the UAR/T 12, and the MEMR control signal on the line 28 which indicates that data is to be inputted from an I/O interface rack 20-23 or read from one of the controller memories 4 or 42. Two additional control signals for the Boolean processor 41 are generated directly from the status word in the latches 65 and 66. These include a "STACK" signal generated on a control line 70 and a "STATUS IN" signal generated on a control line 71. These control signals are present for the entire machine cycle, or in other words, until a new status word is generated by the microprocessor 40 at the beginning of the next machine cycle.

A number of control signals are derived indirectly from the control signals generated by the status latches 65 and 66. These include the BE signal on the control line 34 which indicates that data is to be outputted to an I/O interface rack 20-23 through the I/O data gates 33, the DATA OUT STROBE signal on the control line 16 which indicates that data is to be transmitted to the program panel 11 by the UAR/T 12, and an "NSPC" control signal which is applied to the Boolean processor 41 through a control line 72. More specifically, the BE signal is derived from an AND gate 73 which has one input connected to the WO control line 29 and a second input connected to the I/O SEL control line 27. The I/O SEL control signal is in turn derived from an AND gate 74 which receives bit 15 in the address bus 3 and the inversion of bits 13 and 14 in the address bus 3. The I/O SEL control line 27 is driven high when an I/O interface rack 20-23 is to be addressed for the purpose of coupling data to it or receiving data from it. The BE control signal, therefore, indicates that data is to be outputted to the addressed I/O interface rack 20-23. The DATA OUT STROBE signal is derived from an AND gate 75 which has one input connected to the OUT control line 15 and a second input connected to a "WR" control line 76 which connects with the microprocessor 40 through the bus 46. The NSPC signal is derived from a circuit which comprises a pair of NAND gates 77 and 78 and a D-type flip-flop 79. One input on each NAND gate 77 and 78 connects to the DATA OUT STROBE control line 16 and a second input on each connects to bit one in the address bus 3. Bit two in the data bus 1 connects to a third input on the NAND gate 77 and to a third input on the NAND gate 78 through an inverter gate 79. The NSPC control line 72 connects to the Boolean processor 41 and its general function is to enable the processor 41 to decode data on the processor data bus 43 and address bus branch 55 when the data is intended for the Boolean processor 41.

The RLE control signal on the line 35 and the ENABLE SD control signal on the line 14 are derived independently of the status word in the latches 65 and 66. The RLE control signal is coupled to the I/O SEL control line 27 through an eight-microsecond time delay 80 and a pair of gates 81 and 82. When the I/O SEL control line 27 goes high, an I/O address is generated to the I/O interface racks 20-23. The eight-microsecond delay allows time for this I/O address to propagate along the I/O address bus 25 and for it to be decoded by the appropriate I/O adaptor circuit 24. The RLE control line is held at a logic low for eight microseconds and is then driven to a logic high voltage to enable the I/O data gates 33 to receive data from the proper I/C slot. To hold the microprocessor 40 during this time delay a "READY" control line 83 is driven low by a tri-state inverter gate 84 during the eight-microsecond time period. This line 83 is connected to an input on the clock generator and driver circuit 68 and during a data input operation the microprocessor 40 is held, or stopped, until the eight-microsecond delay period has expired. The enable SD control signal on the line 14 is derived from an AND gate 85 which has one input connected to receive the DBIN control signal generated by the microprocessor 40 on the control line 51 and a second input connected to receive bit two of the address bus 3. The enable SD signal enables the receipt of data from the program panel 11.

Although the microprocessor 40 functions in response to machine language instructions stored in the ROM 42, the overall function of the programmable controller is governed by the programmable controller type instructions stored in the control program portion 10 of the RAM 4. As will become apparent from the description to follow, these programmable controller type instructions are treated as "macroinstructions" in the invented controller in that they are executed by a series of microprocessor machine instructions. Before describing the manner in which the controller elements function to execute the programmable controller type instructions, however, a brief discussion of the programmable controller instruction set is in order. The macroinstruction set is essentially the same as that described in the above cited U.S. Pat. No. 3,942,158 entitled "Programmable Logic Controller" which includes three general types: bit instructions; word instructions; and control instructions. Bit instructions and word instructions are stored on two memory lines, the first line storing an operation code and the second line storing an operand address. The control instructions are comprised solely of a two-line operation code. The bit instructions include the following:

TABLE I

| MNEMONIC | BIT POINTER | | | OPERATION CODE | | | | Execution Time |
|---|---|---|---|---|---|---|---|---|
| XIC/XOE | X | X | X | 0 | 1 | 0 | 1 | 1 | |
| XIO/XOD | X | X | X | 1 | 1 | 0 | 1 | 1 | 12.5 usec. |
| OTU | X | X | X | 1 | 0 | 1 | 1 | 1 | |
| OTL | X | X | X | 0 | 0 | 1 | 1 | 1 | |
| OTD | X | X | X | 1 | 1 | 1 | 1 | 1 | 16.5 usec. |
| OTE | X | X | X | 0 | 1 | 1 | 1 | 1 | |
| INSTRUCTION BIT NUMBER | 0 | 1 | 2 | 3 | 4 | 5 | 6 | 7 | |

The operations performed by these bit instructions are briefly defined as follows:

XIC—Examine status bit closed or, is the status bit in a logic 1 state?

XOE—Same as XIC, but refers to a status bit in the output image table.

XIO—Examine status bit open or, is the status bit in a logic 0 state?

XOD—Same as XIO, but refers to a status bit in the output image table.

OTU—If conditions are true turn status bit off, or to a logic 0 state, and if false do nothing.

OTL—If conditions are true turn status bit on, or to a logic 1 state, and if false do nothing.

OTD—If conditions are true turn status bit off and if conditions are false turn status bit on.

OTE—If conditions are true turn status bit on and if conditions are false turn status bit off.

The operand address which is associated with each of the above operation codes identifies the memory address of the word containing the desired status bit whereas the bit pointer associated with the operation code identifies the location of the status bit in the addressed memory word.

The control instructions include the following:

TABLE II

| MNEMONIC | OPERATION CODE | | | | | | | | Execution Time |
|---|---|---|---|---|---|---|---|---|---|
| NOP | X | 0 | 0 | 0 | 0 | 0 | 0 | 0 | |
| BND | X | X | X | 0 | 0 | 0 | 1 | 1 | |
| BST | X | X | X | 1 | 0 | 0 | 1 | 1 | 8.5 usec. |
| MCR | X | X | X | 1 | 1 | 1 | 0 | 1 | |
| END | 0 | 0 | -1 | 0 | 0 | 1 | 0 | 0 | ≈100 usec. |
| INSTRUCTION BIT NUMBER | 0 | 1 | 2 | 3 | 4 | 5 | 6 | 7 | |

Note: X Signifies "don't care"

The operations performed by these control instructions are briefly defined as follows:

NOP—No operation

BND—Branch end: termination of a Boolean sub-branch

BST—Branch start: opens or begins a Boolean sub-branch

END—End of the control program

MCR—Operate master control flip-flop.

The word type programmable controller instructions include the following:

TABLE III

| Mnemonic | OPERATION CODE | | | | | | | | Execution Time |
|---|---|---|---|---|---|---|---|---|---|
| TOF 0.1 sec. | 0 | 0 | 0 | 1 | 0 | 0 | 0 | 0 | |
| TOF 1.0 sec. | 0 | 1 | 0 | 1 | 0 | 0 | 0 | 0 | |
| TON 0.1 sec. | 0 | 0 | 1 | 1 | 0 | 0 | 0 | 0 | |
| TON 1.0 sec. | 0 | 1 | 1 | 1 | 0 | 0 | 0 | 0 | ≈100 usec. |
| RTO 0.1 sec. | 0 | 0 | 0 | 0 | 1 | 0 | 0 | 0 | |
| RTO 1.0 sec. | 0 | 1 | 0 | 0 | 1 | 0 | 0 | 0 | |
| CTD | 0 | 1 | 1 | 0 | 1 | 0 | 0 | 0 | |
| CTU | 0 | 0 | 1 | 0 | 1 | 0 | 0 | 0 | |
| RTR | 0 | 1 | 0 | 0 | 0 | 1 | 0 | 0 | ≈100 usec. |
| CTR | 0 | 0 | 0 | 0 | 0 | 1 | 0 | 0 | |
| PUT | 0 | 1 | 0 | 1 | 1 | 0 | 0 | 0 | |
| GET | 0 | 0 | 0 | 1 | 1 | 0 | 0 | 0 | |
| EQU | 0 | 0 | 1 | 1 | 1 | 0 | 0 | 0 | ≈100 usec. |
| LES | 0 | 1 | 1 | 1 | 1 | 0 | 0 | 0 | |
| INSTRUCTION BIT NUMBER | 0 | 1 | 2 | 3 | 4 | 5 | 6 | 7 | |

The operations performed by these word-type instructions are briefly defined as follows:

TOF—If conditions are true turn output on, otherwise, wait until time is out then turn output off.

TON—If conditions are true wait until time is out then turn output on, otherwise, turn output off.

RT0—If conditions are true wait until time is out then turn output on, otherwise, stop timer.

CTD—If the conditions are true reduce the count by one.

CTU—If the conditions are true increase the count by one.

PUT—If conditions are true write the number in the microprocessor accumulator in the selected memory line, otherwise, do nothing.

RTR—If the conditions are true reset the timer.

CTR—If the conditions are true reset the counter.

GET—Fetch the word on the selected memory line and store in the microprocessor accumulator.

EQU—Is the value stored in the microprocessor accumulator equal to the value stored on the selected memory line?

LES—Is the value stored in the microprocessor accumulator less than the value stored on the selected memory line?

The operand address which is associated with each of these word-type operation codes is an eight-bit address, which, when combined with the 8K constant, is a memory address of a line in the RAM 4.

The programmable controller type instructions are executed by the combined operation of the microprocessor 40 and the Boolean processor 41. With some of the word-type controller instructions such as GET, EQU, and LES, the microprocessor 40 performs virtually all of the indicated operations in combination with the RAM 4. On the other hand, with the control type instructions such as BST, BND and MCR, the microprocessor 40 serves only to read the operation code from the RAM 4 and properly enable the Boolean processor 41. The Boolean processor 41 actually performs the indicated operation. With most programmable controller type instructions, however, the operations indicated by the instruction are performed in part by the microprocessor 40 and in part by the Boolean processor 41. This sharing of functions is an important aspect of the present invention which will now be described in detail. In general, those functions, or operations, which can be most efficiently executed by the word-oriented microprocessor 40 are assigned to it and those functions which can most efficiently be executed by the single-bit oriented Boolean processor 41 are assigned to it.

Referring particularly to FIG. 2, the Boolean processor 41 is connected to the processor data bus 43 to receive data directly from the microprocessor 40, and is connected to the data bus 1 to both receive data from the RAM 4 and to generate data to both the RAM 4 and the microprocessor 40. The operation of the Boolean processor 41 is controlled through the lines which connect it to the timing and control circuit 45 (i.e., WO 29, DBIN 51, STACK 70, STATUS IN 71, and NSPC 72). In addition, the Boolean processor 41 is responsive to the operation codes in programmable controller type instructions which are received directly from the RAM 4 or indirectly through the microprocessor 40.

Referring particularly to FIG. 3a, the leads (D0-D7) in the processor data bus 43 which connect to the Boolean processor 41 couple through respective tri-state gates 90-97 to the corresponding leads (DB0-DB7) in the data bus 1. The control terminals on the tri-state gates 90-97 connect to respective outputs 98 on a bit selector prom 99, and in response to a bit pointer code received at a set of three prom input terminals 100, one of the gates 90-97 may be selectively opened to decouple its associated processor bus lead from its associated data bus lead. The bit pointer code is received from the microprocessor 40 through the bus 55 and it is also applied to the input terminals 101 of a bit pointer circuit 102. In response, the bit pointer circuit 102 generates a logic low voltage at a selected one of its eight output terminals 103, each of which connects to the respective control terminals on a set of eight output tri-state gates 104-111. The input of each gate 104-111 connects to an exclusive OR gate 112 and their outputs connect to the respective leads DB0-DB7 in the data bus 1. One input on the exclusive OR gate 112 connects to the bus 55 through a lead 113 to receive bit number eleven in the processor address bus 44 and its second input connects to a "decision" line 114. The bit selector prom 99 and the bit pointer circuit 102 are enabled through an "OTX" line 115 and they are clocked by the WO signal on the control line 29.

As will be described in more detail hereinafter, the logic state of the decision line 114 represents the solution of a Boolean expression and it is in essence the logic output of the Boolean processor 41. This logic output indicates that a particular status bit in the I/O image table 8 is to be set at a logic one or logic zero state. The memory line containing the particular bit to be set is indicated by the operand address of one of the programmable controller type instructions OTE, OTD, OTL or OTU. The I/O image table status word is read from the RAM 4 into the microprocessor 40 and is then written back into the RAM 4 by coupling it through the Boolean processor 41. The bit pointer code indicates which status bit in this status word is to be altered as it passes through the Boolean processor 41, and when the WO control line 29 goes high, the appropriate tri-state gate 90-97 is disabled by the bit selector prom 99 and the corresponding output tri-state gate 104-111 is enabled by the bit pointer circuit 102. By thus coupling the logic state of the decision line 114 to the appropriate lead in the data bus 1, the proper status bit is set while the I/O image table status word is "on the fly" between the microprocessor 40 and the RAM 4. It should be apparent to those skilled in the programmable controller art that the exclusive OR gate 112 serves to invert the logic state of the decision line 114 and to thus distinguish between the operation called for by the OTE and OTL operation codes and the "inverse" operation called for by the OTD and OTU operation codes.

Referring still to FIG. 3a, the Boolean processor 41 is responsive to a number of the operation codes in programmable controller type instructions which are read from the RAM 4 by the microprocessor 40. The control type instruction operation codes (MCR, BST, BND) are applied to an instruction decoder prom 120 which has a set of four inputs 121 connected to data bus leads DB2-DB6 and the bit instruction operation codes (XIC, XIO, OTE, OTL, OTD, OTU) are applied to an instruction decoder prom 122 which has a set of five input terminals 123 connected to receive processor address bus leads AB11-AB15 through the bus 55.

The instruction decoder prom 120 is enabled by logic high voltages applied to inputs which connect respectively to the STACK control line 70, the NSPC control line 72 and the bit zero lead (AB0) in the processor address bus 44. When thus enabled, a logic high voltage is generated by the prom 120 on an "MCR" line 124 when an MCR operation code is present on the data bus 1. Similarly, a logic high voltage is generated on a "BST" line 125 when a BST operation code is present, or a logic high voltage is generated on a "BND" line 126 when a BND operation code is present. The MCR, BST and BND control lines 124, 125 and 126 separately connect to the logic unit portion of the Boolean processor 41 illustrated in FIG. 3b. All three outputs of the instruction decoder prom 120 connect to inputs on an OR gate 128 and the output of the OR gate 128 connects to a "clear" control line 129. The clear control line 129 signals the completion of the execution of a programmable controller instruction and it connects to elements of the logic unit illustrated in FIG. 3b and to an AND gate 130 in the timing and control circuit of FIG. 4. The clear line 129 signals the microprocessor 40 that the Boolean processor 41 has completed its function and that another controller instruction can be read from the RAM 4 and executed.

The instruction decoder prom 122 is controlled by the DBIN control line 51 and the NSPC control line 72. When an XIC or XIO operation code appears on the bus 66, a logic high voltage is generated by the prom 122 on an "XIC/XIO" line 131, and when an OTE, OTD, OTL or OTU operation code is present, a logic high voltage is generated on the OTX line 115. The OTX line 115 connects to the bit selector prom 99 and the bit pointer prom 102 as described above. The XIC/XIO line 131 connects to elements of the logic unit in FIG. 3b and a third output 132 on the decoder prom 122 connects to one input on an OR gate 133. A fourth output 134 connects to an input on the OR gate 128. A second input on the OR gate 133 connects to the MCR line 124 and the output of the gate 133 connects to a "TERM" line 135. The output 134 enables the OR gate 128 when either the OTX line 115 or the XIC/XIO line 131 goes high whereas the output 132 enables the OR gate 133 when the OTX line 115 goes high. The TERM line 135 is thus driven high when one of the "terminating" operation codes OTE, OTD, OTL, OTU or MCR is present.

Referring particularly to FIG. 3b, the logic unit portion of the Boolean processor 41 includes a set of four flip-flops 137-140 which are interconnected by a set of logic gates 141-148. The input to the logic unit is a bit selector 157 which has a set of eight inputs 149 connected to the respective leads DB0–DB7 in the data bus 1. The bit selector 157 also includes a set of three bit-select inputs 150 which connect to the bus 55 to receive the bit pointer code generated by the microprocessor 40 on address bus leads eight, nine and ten. In response to this bit pointer code, the bit selector 157 couples the logic state, or status, of one of the data bus leads DB0–DB7 to an output terminal 151. The output terminal 151 connects through an exclusive OR gate 152 to an input on the respective logic unit NAND gates 141 and 146 and a second input on the exclusive OR gate 152 connects to the bus 55 to receive address bus bit number eleven. The exclusive OR gate 152 operates to invert the logic state of the selected status bit when an XIO instruction is being executed and it thus serves to distinguish the XIO and XIC operation codes. A second input on each of the NAND gates 141 and 146 connect to the XIC/XIO line 131 and a third input on the NAND gate 141 connects to the Q output of flip-flop 137. The output of NAND gate 141 couples through NAND gate 143 to the K input of flip-flop 138 and the output of NAND gate 146 couples through NAND gate 147 to the K input of flip-flop 140. The TERM line 135 and the BND line 126 connect through the OR gate 148 to the K inputs on flip-flops 137 and 139 and to the inverter gate 142. The output of inverter gate 142 connects to a second input on the NAND gate 143 and the TERM line 135 connects to the J input on the flip-flop 140. The clear line 129 connects to the clock terminals on each of the flip-flops 137–140 and the BST line 125 connects to one input of AND gate 144 and the J terminals on the flip-flops 137 and 138. The AND gate 144 also couples the Q output of flip-flop 138 to the J input of flip-flop 139. The BND line 126 connects to one input on NAND gate 145 and the $\overline{Q}$ outputs on the flip-flops 138 and 139 connect to respective second and third inputs on the NAND gate 145. The output of NAND gate 145 is coupled to the K input on flip-flop 140 by the NAND gate 147 and the $\overline{Q}$ output of flip-flop 137 connects to a third input on the NAND gate 146.

The Q output of the flip-flop 140 serves as the logic unit output and it couples through an AND gate 158 to the decision line 114. In addition, the Q outputs of the flip-flops 137–140 are coupled to respective data bus leads DB4, DB3, DB1 and DB7 by respective tri-state gates 153–156. The control terminal on each tri-state gate 153–156 is connected to the STATUS IN line 71, and when a logic high voltage is generated thereon by the timing and control circuit 45, the status of the logic unit flip-flops 137–140 are gated onto the data bus 1 and into the microprocessor 40.

The operation of the logic unit will be explained with the use of the ladder diagram of FIG. 6 in which four sensing devices (one through four) are tested to determine whether or not an operating device (five) is to be energized. The "intensified" sensing devices (one and three) are presumed closed when their status is examined and the remaining sensing devices are presumed open. The following control program is stored in the RAM to make the determination and to energize the operating device (five) if indicated by the logic unit.

| Instruction No. | Instruction | State of Logic Unit Flip-Flops After Instruction is Executed | | | |
|---|---|---|---|---|---|
| | | 137 | 138 | 139 | 140 |
| 1 | XIC 1 | 0 | 0 | 0 | 1 |
| 2 | BST 1 | 1 | 1 | 0 | 1 |
| 3 | XIC 2 | 1 | 0 | 0 | 1 |
| 4 | BST 2 | 1 | 1 | 0 | 1 |
| 5 | XIC 3 | 1 | 1 | 0 | 1 |
| 6 | BND | 0 | 0 | 0 | 1 |
| 7 | XIC 4 | 0 | 0 | 0 | 0 |
| 8 | OTE 5 | 0 | 0 | 0 | 1 |

The logic unit of FIG. 3b begins the execution of the Boolean equation with the main decision flip-flop 140 in a true state (i.e., a logic high at its Q output) and the branch select flip-flop 137, the branch decision flip-flop 138 and the branch hold flip-flop 139 in their false state. When the first instruction (XIC 1) is executed the logic state of sensing device one is coupled through gates 152, 146 and 147 to the K input of the main decision flip-flop 140. The state is true, or a logic high, and a logic low is thus applied to the K input when the flip-flop 140 is clocked through the clear line 129. The main decision flip-flop 140 remains in its true state to indicate that the main branch is thus far "conductive."

The second instruction (BST 1) generates a logic high on the BST line 125, which initializes the branch select flip-flop 137 and the branch decision flip-flop 138. The flip-flops 137 and 138 are thus set to their true state, and their outputs enable the gates 141 and 144 and disable the gate 146. The subsequent control instruction (XIC 2) causes a logic low voltage to be generated at the output 151 of bit selector 157 and this is coupled through gates 152, 141 and 143 to the K terminal of the branch decision flip-flop 138. The flip-flop 138 is reset to its false state when clocked through the clear line 129 to indicate that the branch is non-conductive.

The fourth control instruction (BST 2) transfers the state of the branch decision flip-flop 138 to the branch hold flip-flop 139 through the AND gate 144 and sets, or initializes, the flip-flop 138 for the next branch examination. It should be apparent that, if the first branch containing sensing device two had been true, this fact would be stored in the flip-flop 139 after the fourth control instruction was executed, but in the example this is not the case and it is in a false state to indicate that no conductive branches have been found thus far.

The fifth control instruction (XIC 3) is now executed and the result (sensing device three is conductive) is stored in the branch decision flip-flop 138. It should be apparent to those skilled in the art that other sensing devices may be present in the branch and that additional branches may be present, but that in any case, after all branches are examined either the branch hold flip-flop 139 or the branch decision flip-flop 138 (or both) will be in a true state if a conductive branch exists. The sixth control instruction (BND) enables the NAND gate 145 to logically OR the states of the flip-flops 138 and 139 and to couple the result to the main decision flip-flop 140. In the example a conductive branch exists and the state of the main decision flip-flop 140 remains true. The BND instruction also resets the flip-flops 137–139 through the BND control line 126 and the OR gate 148.

The seventh control instruction (XIC 4) is now executed to examine the last sensing device in the main branch. It is open, or false, and a logic high is thus coupled to the K input of the main decision flip-flop 140 to reset it to a false state. Its Q output is thus at a logic low voltage and when the final control instruction (OTE 5) is executed, this is coupled through the decision line 114 to the circuit in FIG. 3a to deenergize the operating device five as described hereinabove. The OTE instruction also terminates the Boolean equation and a logic high voltage is generated on TERM line 135 to set flip-flop 140 and reset flip-flops 137-139 in preparation for the next equation.

The MCR control instruction may be employed to effectively disable the logic unit during the execution of specified portions of the control program. Referring to FIG. 3b, a master control flip-flop 168 has its $\overline{Q}$ output connected to the AND gate 158 to couple or decouple the logic unit output from the main decision flip-flop 140. A pair of AND gates 169 and 170 connect to its J and K inputs respectively and its clock input connects to the CLEAR line 129. One input on each AND gate 169 and 170 connects to the MCR line 124 and second inputs thereon connect to the $\overline{Q}$ and Q outputs on the main decision flip-flop 140. If the main decision flip-flop 140 is in its false state, and MCR control instruction is executed, the flip-flop 168 is set. Its $\overline{Q}$ output thus is driven to a logic low state to disable the AND gate 158. All Boolean equations subsequently executed by the logic unit will be false until another MCR control instruction is executed which sets the flip-flop 168. The master control flip-flop 168 can also be reset directly through its $\overline{PK}$ terminal which is driven by a NAND gate 171 that connects to data out strobe line 16 and data bus lead one (DB1).

In addition to reading the status of the logic unit flip-flops 137-140 onto the data bus 1, the states thereof can be set directly by selected microprocessor instructions. This is accomplished by a set of three NAND gates 180-182 and an AND gate 183 which are connected as shown in FIG. 3b to the flip-flop $\overline{PK}$ and $\overline{PJ}$ terminals. When the logic unit is addressed (i.e., AB1 is at a logic high voltage) data on data bus leads DB6 and DB7 is gated into the logic unit by the data out strobe line 16. The manner in which this is employed is apparent from an examination of the PUT ROUTINE, EQUAL ROUTINE, LESS ROUTINE and TON ROUTINE which are listed in APPENDIX A. In essence, the functions performed by some of these routines are accomplished by the microprocessor 40, and the ultimate result (true or false) is an element of the Boolean equation being executed by the Boolean processor 41. This ultimate result (true or false) must be coupled into the appropriate flip-flops of the logic unit in FIG. 3b and the gates 180-183 are connected to accomplish this. The Boolean processor 41 is thus responsive to logical decisions made by the microprocessor 40 in response to selected programmable controller instructions.

Referring particularly to FIG. 2, the execution of the control program 10 stored in the RAM 4 is under the direction of a control instruction decoder program 175 stored in the ROM 42. This program 175 makes use of a number of internal registers in the microprocessor, including the following:
- (PC) 16-bit program counter;
- (SP) 16-bit "stack" pointer;
- (B) and (C) 8-bit registers arranged as a pair;
- (D) and (E) 8-bit registers arranged as a pair; and
- (H) and (L) 8-bit registers arranged as a pair.

The program counter (PC) stores the memory address of the current machine instruction. During an instruction fetch this memory address is generated on the address bus 3 and the program counter (PC) is then incremented one or several counts. The stack pointer (SP) stores the memory address of the next programmable controller type instruction to be executed. It is initialized to point at the first controller instruction in the control program 10, and after each controller instruction is executed, the stack pointer (SP) is incremented two counts to address the next controller instruction in the control program 10. The six general purpose registers (B, C, D, E, H and L) are used either singly as eight-bit registers or as sixteen-bit register pairs. The microprocessor 40 also includes an eight-bit instruction register which stores the first eight-bit byte of a machine instruction fetched from the ROM 42.

The machine instructions which comprise the macro-instruction decoder program 175 are as follows:

| Mnemonic | Operand | Comment |
|---|---|---|
| POP | H | Load controller instruction indicated by stack pointer (SP) into the H and L registers. |
| MOV | E,M | Get status word from I/O image table 8 indicated by address in L register and apply controller instruction operation code and bit pointer code stored in H register to Boolean processor 41 through the latch 57. |
| MOV | M,E | Store status word back in I/O image table 8. |
| MVI | D,ADRH | Store constant (8K) in D register. |
| MOV | E,L | Transfer memory address stored in L register to E register. |
| MOV | L,H | Transfer controller instruction operation code in H register to L register. |
| MVI | H,000 | Load zeros into H register. |
| DAD | H | Shift contents of H and L registers to the left one bit. |
| IN | STATUS | Input status of Boolean processor 41 and store in A register. |
| ANA | A | Logical AND contents of A register with itself to put status of decision flip-flop 140 into microprocessor ALU flag register. |
| PCHL | | Perform indirect jump to control instruction execution routine by loading memory address stored in mapping table 176 into program counter (PC). |

Only the first machine instruction (POP H) listed in the program above is executed when the controller instruction read from the RAM 4 is a BST, BND or MCR. The POP H instruction reads the controller instruction operation code out of the RAM 4 and enables the instruction decoder prom 120 in the Boolean processor 41. The controller instruction operation code is generated on the data bus 1 in response to this machine instruction, and the BST, BND or MCR code is decoded by the prom 120. A logic high voltage is thus generated on the appropriate line 124, 125 or 126 to the logic unit and a logic high voltage is generated on the "clear" line 129 through the output 134. The logic unit portion (FIG. 3b) responds immediately and no further data or operations are required. The logic high voltage on the clear line 129 resets the microprocessor program counter (PC) to zero through the AND gate 130 in the timing and control circuit 45 (FIG. 4), and as a consequence, the POP H machine instruction is again executed to read out the next controller instruction from the RAM 4. Only one instruction cycle of approximately 8.5 microseconds is thus required to execute a BST, BND or MCR type programmable controller instruction.

Referring particularly to FIGS. 2, 3a and 3b, only the first two machine instructions (POP H and MOV E,M) are required to execute an XIC or an XIO controller instruction. The first machine instruction (POP H) reads the operation code and operand address out of the RAM 4 and loads them into the microprocessor H and L registers respectively. The second machine instruction (MOV E,M) is then executed and the operation code stored in the H register appears on the processor address bus leads AB8–AB15. The multiplexer 56 blocks these eight bits and in place of them, generates the constant (8K) on the leads AB8–AB15 of the address bus 3. The eight-bit macro-instruction operand in the L register appears on the address bus leads AB0–AB7 during the execution of the MOV E,M machine instruction and it serves to select one of the memory addresses $8192_{10}$ to $8448_{10}$ in the I/O image table 8 or the timers and counters portion 9 of the RAM 4. The controller, or macro-instruction operation code in the H register along with the bit pointer code are applied to the Boolean processor 41 through the bus 55 during the execution of the MOV E,M machine instruction. The instruction decoder prom 122 therein identifies the XIC or XIO operation code and generates a logic high voltage on the XIC/XIO line 131.

The data, such as a status word in the I/O image table 8 which is selected by the controller instruction operand, is read out of the RAM 4 by the MOV E,M machine instruction and is applied to the Boolean processor 41 through the data bus 1. This data is applied to the bit selector 148 therein along with the bit pointer code on the bus 55. The bit pointer code selects one of the eight data bits on the data bus 1 and couples it to the logic unit where the logical operation called for by the XIC or XIO controller instruction is executed. A logic high voltage is also generated by the decode prom 122 and applied through the clear line 129 to reset the microprocessor program counter (PC) to zero. An XIC or XIO controller instruction is thus executed with two microprocessor machine instruction cycles which require a total time of approximately 12.5 micro-seconds.

The first three machine instructions in the above described macro-instruction decoder routine 175 are executed when the macro-instruction read from the RAM 4 by the POP H machine instruction is an OTE, OTD, OTL or OTU instruction. The POP H machine instruction loads the macro-instruction in the microprocessor H and L registers and when the next machine instruction (MOV E,M) is executed, the operation code and bit pointer are coupled through the bus 55 to the Boolean processor 41. The operand is coupled through the address bus 3 to select one of the first 256 lines in the RAM 4 and the selected data word is read out and coupled through the data bus 1 and data in buffers 50 to the E register in the microprocessor 40. The third machine instruction (MOV M,E) is then executed to load the contents of the E register back into the same line in the RAM 4. During this transfer, however, the controller instruction operation code and bit pointer code which are still stored in the microprocessor H register are again applied to the Boolean processor 41. Referring particularly to FIG. 3a, the operation code is recognized by the instruction decoder prom 122 which generates a logic high voltage on the OTX line 115. This logic high voltage and a logic high voltage generated on the WO line 29 by the timing and control circuit 45 enable the bit selector prom 99 and the bit pointer circuit 102. The bit pointer code is applied to the prom 99 and the decoder circuit 102 through the bus 55, and as a result, one of the eight tri-state gates 90–97 is driven to its high impedance state to effectively decouple a selected lead in the processor data bus 43 from the data bus 1 during the execution of the MOV M,E machine instruction. In addition, one of the tri-state gates 104–111 which connects to the same lead in the data bus 1 is enabled by the bit pointer circuit 102 and the logic state of the exclusive OR gate 112 is applied thereto. In net effect, therefore, during the third machine instruction (MOV M,E) the eight-bit data word is generated on the processor data bus 43 and coupled through the Boolean processor 41 back to its original location in the RAM 4. During this transfer, the output of the Boolean processor logic unit is imposed on the appropriate bit in that data word as it passes through the Boolean processor 41.

The instruction decoder prom 122 in the Boolean processor 41 is also responsive to the controller instruction operation code OTE, OTD, OTL or OTU to generate a logic high voltage at its output 134 which resets the microprocessor program counter (PC) through the clear line 129. After the third machine instruction (MOV M,E) has been executed, therefore, the system jumps back to the first machine instruction (POP H) to read out the next macro-instruction. An OTE, OTD, OTL or OTU type controller instruction thus requires three machine instruction cycles which result in an execution time of approximately 16.5 microseconds.

Those skilled in the programmable controller art can appreciate that a vast majority of controller instructions in a typical user control program are comprised of the type described above which are executed in from one to three machine instruction cycles by the present invented system. Thus, although the execution of other controller type instructions now to be described requires considerably more machine instructions, the efficient execution of those controller instructions described above has a significant impact on the overall scan time of the programmable controller. Although the Boolean processor 41 may be altered to assist in the execution of more or less controller type instructions, the circuit of the preferred embodiment described herein is believed to be an optimal balance between the cost of the added hardware on the one hand and the increased efficiency and speed of controller program execution on the other hand.

Referring particularly to FIG. 2, the remaining controller type instructions are executed by programs, or routines, which are stored in the ROM 42 and which are referred to collectively as the macro-instruction execution routines and I/O scan routine. It is the general purpose of the machine instructions which comprise the macro-instruction decoder program 175 to call up the proper macro-instruction execution routine each time a macro-instruction is read from the RAM 4 which is not executed as described above by the first three machine instructions.

The mapping table 176 is employed to accomplish this task. For each unique controller instruction operation code there exists a unique macro-instruction execution routine stored at a specific address in the ROM 42, and for each such macro-instruction execution routine there exists a location in the mapping table 176 which stores the starting address of that routine. The specific function of the macro-instruction decoder program 175, therefore, is to load the appropriate mapping table starting address into the microprocessor program counter (PC).

Referring specifically to the macro-instruction decoder program 175 listed above, after the first three machine instructions are executed the control instruction operation code is stored in the microprocessor H register and the operand address is stored in the L register. The fourth machine instruction (MVI D,ADRH) loads the constant 8K into the microprocessor D register. The next machine instruction (MOV E,L) transfers the control instruction operand address from the L register to the E register and the sixth machine instruction (MOV L,H) transfers the operation code from the H register to the L register. The seventh machine instruction (MVI H,000) loads zeros into the H register and the eighth machine instruction (DAD H) shifts the contents of the H and L register pair left one bit location. At this point, the L register stores the least significant eight bits of the proper line in the mapping table 176. In other words, each macro-instruction operation code is shifted one place to the left to provide the memory location of the line in the mapping table 176 which stores the starting address of its associated macro-instruction execution routine.

Before reading out the contents of the appropriate line in the mapping table 176, however, the status of the Boolean processor 41 is loaded into the microprocessor A register by the ninth machine instruction (IN STATUS). This machine instruction causes a logic high voltage to be generated on the STATUS IN control line 71, and as shown in FIG. 3b, this enables the tri-state gates 153-156 to couple the state of the logic unit flip-flops 137-140 to the data bus 1. Of particular importance is the state of the main decision flip-flop 140 which is applied to the most significant digit lead (DB7) in the data bus 1 and which represents the output, or decision, of the Boolean processor logic unit. Thus when the next machine instruction (ANA A) is executed to logically AND the contents of the A register with itself, the state of the most significant bit, or in other words, the decision of the Boolean processor 41, is stored in the microprocessor flag register for later use.

Finally, the eleventh and last machine instruction in the control instruction decoder program 175 is executed. The instruction (PCHL) places the contents of the H and L registers into the program counter, thus adjusting the program counter to point to a specific line in the mapping table 176 of the ROM 42. As indicated above, the content of each line in the mapping table 176 is a jump instruction to the starting address of the appropriate macro-instruction execution routine.

The macro-instruction execution routines for the controller instruction operation codes, other than those executed directly by the first three machine instructions in the macro-instruction decoder program 175, are listed in APPENDIX A. Before discussing two of these routines some general observations should be made. First, each control instruction execution routine is terminated with a jump to zero instruction which resets the microprocessor program counter (PC) to zero. In other words, after a macro-instruction execution routine has been executed, the system jumps back to the POP H machine instruction in the macro-instruction decoder routine 175 to read out the next macro-instruction from the control program 10. The last controller instruction in the control program is the END instruction which "maps" into the I/O scan routine. As will be explained in detail hereinafter, the I/O scan routine couples data between each line of the I/O image table 8 and the cards of the I/O interface racks 20-23. In addition, near the completion of the I/O scan routine the memory address of the first controller instruction in the control program 10 is calculated and loaded into the stack pointer (SP). Consequently, when the system jumps back to the POP H instruction at the completion of the I/O scan routine, the first macro-instruction in the control program 10 will be executed next. In other words, after the I/O scan routine is executed the system immediately commences another scan, or sweep, through the control program 10.

Referring particularly to FIG. 1, the I/O scan routine in Appendix A is executed after each scan through the control program 10. The first two machine instructions in this routine reset the flip-flop 79 in the timing and control circuit 45 to drive the NSPC control line 72 to a logic low voltage. This effectively disables the Boolean processor 41 during the execution of the I/O scan routine so that it does not react to data on the processor address bus 44. The next two machine instructions (LXI H,IOST and LXI D,MDST) load the memory address of the first line in the I/O image table 8 into the H and L registers and load the I/O address of the low card in the first I/O slot into the D and E registers. The following two machine instructions (LDA NOSL and MOV C,A) load the total I/O slot count into the C register and then a loop is established which transfers data between the I/O image table 8 and the cards in the I/O interface racks 20-23.

More specifically, the status word in the I/O image table 8 addressed by the contents of the H-L register is loaded into the A register and that status word is then coupled to the low card in the addressed I/O slot by the STAX D machine instruction. A status word is then coupled from the same I/O card to the A register by the LDAX D machine instruction and is saved in the B register. The H-L register is then incremented one count to address the next I/O image table line and the D-E register is incremented one count to address the next I/O card. The process is then repeated; that is, the addressed status word is read from the RAM 4 and coupled through the microprocessor A register to the addressed I/O card. A status word is then inputted from the same I/O card and stored in the A register. The H-L register is incremented one count to address the next line in the I/O image table 8 and the status word stored in the B register is written into it by the MOV M,B machine instruction. The H-L register is again incremented one count and the status word in the A register is written into the next line of the I/O image table 8. The D-E and H-L registers are both incremented one count and the slot count in the C register is decremented by the DCR C machine instruction. If the C register has not been counted down to zero as determined by the JNZ LP1 machine instruction, the routine loops back to the LP1 label to repeat the I/O data transfer between two I/O cards and four lines of the I/O image table 8.

When the C register has been counted down to zero all I/O cards have been serviced and the I/O scan routine prepares to return to the macro-instruction decoder routine 175. First, however, the stack pointer register (SP) is set to point to the memory address of the first macro-instruction in the control program 10. This is accomplished with a series of machine instructions which calculate the number of lines occupied by the I/O image table 8 and timers and counters 9 and add to this quantity the thirty-two lines of working registers 7. The flip-flop 79 is then set to drive the NSPC control line 72 to a logic high voltage and the I/O scan routine jumps to the POP H machine instruction in the macro-instruction decoder routine 175.

Although the timer control instructions (TON and TOF) map into corresponding macro-instruction execution routines, the Boolean processor 41 does provide considerable assistance to the microprocessor 40 in handling them. Referring to FIG. 3b, the Boolean processor 41 includes a real-time clock 160 which has an input connected to receive bit one in the data bus 1 and an output which connects to bit zero in the data bus 1. The real-time clock 160 includes a clock select flip-flop 161 which receives the input DB1 at its D input and which receives a clock signal at its C input during the execution of the POP H instruction. The Q output on the flip-flop 161 connects directly to the input of an AND gate 162 and through an inverter gate 163 to the input of a second AND gate 164. A second input on each of the AND gates 162 and 164 connects to the STATUS IN control line 71 and their outputs connect to the control terminals on respective tri-state gates 165 and 166. The tri-state gate 165 is driven by a 0.5 hertz clock signal and the tri-state gate 166 is driven by a 5 hertz clock signal. Both of their outputs connect to bit zero in the data bus 1.

Each time a TON or TOF macro-instruction is executed a logic high or a logic low voltage appears on the data bus lead DB1 to indicate whether the 0.1 or 1.0 second timing range is selected. This data is clocked into the flip-flop 161 which enables the appropriate AND gate 162 or 164. As indicated above, before the macro-instruction decoder routine 175 "maps" into the TON or TOF macro-instruction execution routine, an IN STATUS machine instruction is executed. This machine instruction generates a logic high voltage on the STATUS IN control line 71 which gates the logic state of the selected clock, 0.5 hertz or 5 hertz, onto bit zero of the data bus 1. This clock bit is stored in the A register of the microprocessor 40 before the system maps into the TON or TOF macro-instruction execution routine.

Referring to FIG. 7 and the TON ROUTINE in APPENDIX A, each TON operation code refers to a particular timer which is identified by its associated operand. This associated operand is an address in the RAM 4 of the first timer word, and it is stored in the D and E microprocessor registers as the system maps into the TON ROUTINE. The timer is comprised of four eight-bit memory words: a first accumulator word 180; a second accumulator word 181; a first preset value word 182; and a second preset value word 183. The two preset value words 182 and 183 store a three-digit decimal number in binary coded decimal form which is loaded into the RAM 4 through the program panel 11. This three-digit number (000–999) is thus the preset value of the timer. The two accumulator words 180 and 181 provide storage for a three-digit number (000–999) which represents the time which has elapsed, or accumulated, since the timer was turned on. The accumulated time is incremented in response to the real-time clock 160 (FIG. 3b) as will be described hereinafter, and when the accumulated time is equal to the preset value stored in words 182 and 183, the timer has "timed out." Bit seven in the first accumulator word 180 is set to a logic one state when the timer is on, or timing, and the fifth bit is set to a logic one state when the timer has timed out. The fifth and seventh bits in the first accumulator word 180 may be examined by controller instructions in the control program 10 to ascertain the status of the timer.

The timer is treated as an operating device which is turned on when the proper conditions exist. That is, the timer is the terminating element in a Boolean expression and it is turned on or off depending on the solution to that Boolean expression. Referring to the TON ROUTINE, the second instruction therein (JM RSET) makes this determination. If the output of the Boolean processor logic unit is true (as indicated by bit 7 in the microprocessor flag register) the TON ROUTINE is executed in its entirety. Otherwise, the system jumps to the label "RSET" near the end of the TON ROUTINE.

Assuming conditions are proper, or true, the subsequent machine instructions fetch the two accumulator words 180 and 181 and store them in the E and D registers. Bit five in the first accumulator word 180 is then examined to determine if the timer has timed out. If it has, the JNZ FLGS instruction causes a jump to the label "FLGS" near the end of the TON ROUTINE. If not, the subsequent instructions compare bit zero in the second accumulator word 181 with the real-time clock state (bit zero in the microprocessor flag register) to determine if the accumulated time should be incremented. If not, a jump to the label "FLGS" occurs, otherwise, the three-digit accumulated time number is incremented one count.

After the accumulated time number is incremented, it is compared with the preset time number to determine whether they are equal. If they are equal, the timer has "timed out" and bit five in accumulator word 180 is set to a logic one state. The comparison is made without transferring the preset value words 182 and 183 into the microprocessor, and after it is made, the updated accumulator words 180 and 181 are transferred back to their locations in the RAM 4.

Referring particularly to FIG. 3b, the set of machine instructions commencing at the label "FLGS" reset the logic unit of the Boolean processor 41 and return the system to the POP H instruction in the macro-instruction decoder routine 175. It will be recalled that with the "terminating" controller instructions which are executed directly by the Boolean processor 41 (MCR, OTU, OTL, OTD, OTE) the hardware generates a logic high voltage on TERM line 135 which resets the flip-flops 137–139 to a false state and sets the main decision flip-flop 140 to a true state in preparation for the execution of the next Boolean equation. The TON instruction is also a terminating instruction, and to condition the logic unit flip-flops 137–140 at the completion of its execution, a mask identified as "44H" is outputted to the Boolean processor 41 to enable the NAND gate 182. As is apparent from the above description, although the microprocessor 40 performs most of the functions required by the TON controller instruction, data is coupled between it and the Boolean processor 41 at both the outset and completion of the TON ROUTINE.

A somewhat different manner of coordination between the microprocessor 40 and Boolean processor 41 occurs when the EQL operation is performed. Referring to the EQUAL ROUTINE in APPENDIX A, the first machine instruction after mapping into the EQUAL ROUTINE examines bit seven in the microprocessor flag register to ascertain whether or not the main decision flip-flop is true or false. If false, there is no point in performing the EQL function because the ultimate result of the Boolean expression (false) cannot be altered. A jump to the POP H instruction in the macro-instruction decoding routine 175 is, therefore, made. If the main decision is true on the other hand, the content of the memory lines identified by the operand of the EQL macro-instruction is transferred to the microprocessor A register and compared with the content of the C and B registers. If the arithmetic values are equal, the system jumps to the POP H instruction in macro-instruction decoding routine 175. The state of the Boolean processor logic unit is not changed.

If the arithmetic values are not equal, however, the tested condition called for by the EQL macro-instruction is false and this result must be coupled to the Boolean processor logic unit of FIG. 3b. More specifically, a mask identified as "84H" is coupled to the Boolean processor logic unit by the OUT STATUS instruction. This generates a logic high voltage on data bus lead 7 (DB7) which is coupled through either the NAND gate 180 to drive the branch decision flip-flop 138 false or is coupled through the NAND gate 181 to drive the main decision flip-flop 140 false. Note that the state of the branch select flip-flop 137 determines which logic unit flip-flop will be driven false and thus the position within the ladder diagram rung (i.e., one of its branches or its main branch) of the element represented by the EQL macro-instruction is automatically accounted for by the logic unit hardware. The duties called for by the EQL macro-instruction are thus shared substantially equally in the present system by the Boolean processor 41 and the microprocessor 41.

APPENDIX A

I/O SCAN ROUTINE

| Label | Instruction | Comment |
|---|---|---|
| SCAN | MVI A,42H | Drive NSPC control line 72 to a |
|  | OUT STATUS | logic low by resetting flip-flop 79. |
| IOSC | LXI H,IOST | Load starting memory address (8K) I/O image table 8 into H and L registers. |
|  | LXI D,MDST | Load starting address of I/O slots into D and E registers. |
|  | LDA NOSL | Store number of I/O slots in A register. |
|  | MOV C,A | Transfer number of I/O slots to C register. |
| LPI | MOV A,M | Load addressed status word in I/O image table 8 into A register. |
|  | STAX D | Output status word in A register to the addressed I/O card. |
|  | LDAX D | Input status word from the addressed I/O card and store in A register. |
|  | MOV B,A | Transfer status word from A register to B register. |
|  | INX H | Increment H register to point at next status word in I/O image table 8. |
|  | INX D | Increment D register to point at next I/O card. |
|  | MOV A,M | Load addressed status word in I/O image table 8 into A register. |
|  | STAX D | Output status word in A register to the addressed I/O card. |
|  | LDAX D | Input status word from addressed I/O card and store in A register. |
|  | INX H | Increment H register to point at next line in I/O image table 8. |
|  | MOV M,B | Transfer status word in B register to the memory line addressed by H register. |

APPENDIX A-continued

| | | |
|---|---|---|
|  | INX H | Increment H register to point at next line in I/O image table 8. |
|  | MOV M,A | Transfer status word in A register to the addressed I/O image table line. |
|  | INX H | Increment H register to point at next line in I/O image table 8. |
|  | INX D | Increment D register to address I/O card in next slot. |
|  | DCR C | Decrement slot count in C register. |
|  | JNZ LPI | If slot count is not zero, jump back to label LPI. |
|  | LDA NOSL | Load total number of slots in A register. |
|  | MOV L,A | Transfer contents of A register to L register. |
|  | LDA NOTC | Load total number of timers and counters. |
|  | ADD L | Add total number of slots with total number of timers and counters in A register. |
|  | RLC | Multiply contents of A register |
|  | RLC | by four. |
|  | ADI 32 | Add thirty-two to the number in the A register. |
|  | MOV L,A | Transfer calculated control program starting address stored in A register to the L register. |
|  | MVI H,ADRH | Load the constant 8K into the H register. |
|  | SPHL | Transfer contents of H and L registers to the stack pointer register (SP). |
|  | MVI A,46H | Drive NSPC control line 72 to a |
|  | OUT STATUS | logic high by setting flip-flop 79. |
|  | JMP MAIN | Jump to POP H instruction in control instruction decoder routine 175. |

TON ROUTINE

| Label | Instruction | Comment |
|---|---|---|
| TON | XCHG | Exchange contents of D and E registers with contents of H and L registers. |
|  | JM RSET | If decision of Boolean processor is false, jump to RESET. |
|  | MOV B,A | Save status of Boolean processor logic unit in B register. |
|  | MOV E,M | Fetch first eight-bit accumulator word from the RAM 4 and store in E register. |
|  | INR L | Increment L register to point at second accumulator word. |
|  | MOV D,M | Fetch second accumulator word from the RAM 4 and store in D register. |
|  | MOV A,E | Transfer first accumulator word to A register. |
|  | ANI 20H | Logical AND bit 5 of first accumulator word with a one. |
|  | JNZ FLGS | If bit 5 is a one, the timer has timed out and a jump is made to FLGS. |
|  | MOV A,D | Transfer second accumulator word into A register. |
|  | XRA B | Compare bit zero of second accumulator word with bit zero of Boolean processor status word (real-time clock). If they are the same, jump to FLGS. |
|  | ANI 01H |  |
|  | JZ FLGS |  |
|  | ADD D | Increment least significant BCD digit of second accumulator word and increment next higher BCD digit therein if a carry occurs. |
|  | DAA |  |
|  | MOV D,A | Transfer second accumulator word back to D register. |
|  | MVI A,00H | Transfer first accumulator word to A register and increment BCD digit therein if a carry occurred. |
|  | ADC E |  |
|  | DAA |  |
|  | MOV E,A | Save first accumulator word in E register. |
|  | ANI 0FH | Zero out microprocessor flag register. |

APPENDIX A-continued

| Label | Instruction | Comment |
|---|---|---|
| | INR L | Increment L register to point at first preset value word in RAM 4. |
| | CMP M | Compare BCD digit in first accumulator word with BCD digit in first preset value word and if not equal, jump to ST5. |
| | JNZ ST5 | |
| | INR L | Increment L register to point at second preset value word. |
| | MOV A,D | Transfer second accumulator word in D register to A register. |
| | CMP M | Compare BCD digits in second accumulator word with BCD digits in second preset value word and if not equal, jump to ST5. |
| | DCR L | |
| | JNZ ST5 | |
| | MOV A,E | Transfer first accumulator word back into A register. |
| | ORI 20H | Set bit five to one to indicate that the timer has timed out. |
| ST5 | ORI 80H | Set bit seven to one to indicate the timer is on. |
| | DCR L | Point to memory address of second accumulator word. |
| | MOV M,D | Transfer bit accumulator word back to RAM 4. |
| | DCR L | Point to memory address of first accumulator word. |
| | MOV M,D | Transfer first accumulator word back to RAM 4. |
| FLGS | MVI A,44H | Load reset status word into A register and output to logic unit in Boolean processor 41. |
| | OUT STATUS | |
| | JMP MAIN | Jump to POP H instruction in macro-instruction decoder routine 175. |
| RSET | XRA A | Set A register to all zeros. |
| | MOV M,A | Set first accumulator word in RAM 4 to all zeros. |
| | INR L | Point to second accumulator word in RAM 4. |
| | MOV M,A | Set second accumulator word in RAM 4 to all zeros. |
| | JMP FLGS | Jump to FLGS. |

GET ROUTINE

| Label | Instruction | Comment |
|---|---|---|
| GET | XCHG | Exchange contents of D and E registers with contents of H and L. |
| | MOV C,M | Transfer word from addressed line in I/O image table 8 to C register. |
| | INR L | Increment L register to point at next word in I/O image table 8. |
| | MOV A,M | Transfer word from addressed line in I/O image table 8 to A register. |
| | ANI 0FH | Mask out flags. |
| | MOV B,A | Transfer contents of A register in B register. Registers B and C now hold a 16-bit operand. |
| | JMP MAIN | Jump to POP H instruction in control instruction decoder routine 175. |

PUT ROUTINE

| Label | Instruction | Comment |
|---|---|---|
| PUT | JM FLGS | If processor flag register is minus (decision false) jump to label FLGS. |
| | XCHG | Exchange contents of D and E register with contents of H and L. It is presumed that B and C registers store a 16-bit operand. |
| | MOV M,C | Transfer contents of C register to memory line indicated by H and L registers. |
| | INR L | Increment L register to point at next memory line. |
| | MOV M,B | Transfer contents of B register to addressed memory line. |
| FLGS | MVI A,44H | Load reset status in A register and output reset status. |
| | OUT STATUS | |
| | JMP MAIN | Jump to POP H instruction in control instruction decoder routine 175. |

EQUAL ROUTINE

| Label | Instruction | Comment |
|---|---|---|
| EQL | JM MAIN | If processor flag register is false (decision false) jump to POP H instruction in routine 175. |
| | XCHG | Exchange contents of D and E registers with contents of H and L. |
| | MOV A,M | Transfer contents of memory line addressed by H and L into A register. |
| | CMP C | Compare contents of A register with contents of C register. Note, the C register is presumed to have been loaded by previous macro-instructions such as GET. |
| | JNZ RSDN | If not equal, jump to label RSDN. |
| | INR L | Increment L register to point at next memory line. |
| | MOV A,M | Transfer contents of memory line addressed by H and L into A register. |
| | ANI 0FH | Mask out non-arithmetic bits. |
| | CMP B | Compare contents of A register with contents of B register. Note, the B register is presumed to have been loaded by a previous macro-instruction such as GET. |
| | JZ MAIN | If equal, jump to POP H instruction in routine 175. |
| RSDN | MVI A,84H | Load mask into A register. |
| | OUT STATUS | Output contents of A register which forces Boolean processor logic unit false. |
| | JMP MAIN | Jump to POP H instruction in routine 175. |

LESS ROUTINE

| Label | Instruction | Comment |
|---|---|---|
| LES | JM MAIN | If processor flag register is false (decision false) jump to POP H instruction in routine 175. |
| | XCHG | Exchange contents of D and E registers with contents of H and L. |
| | INR L | Increment L register to address desired line in memory. |
| | MOV A,M | Load contents of addressed memory line into A register. |
| | ANI 0FH | Mask out non-arithmetic bits. |
| | CMP B | Compare contents of A and B registers. |
| | JC MAIN | If contents of A register is less than B register, jump to POP H instruction in routine 175. |
| | JNZ RSDN | If contents of A register is greater than B register, jump to RSDN label. |
| | MOV A,E | Transfer contents of E register into A register. |
| | CMP C | Compare contents of A and C registers. |
| | JC MAIN | If contents of A register is less than C register, jump to POP H instruction in routine 175. |
| RSDN | MVI A,84H | Load mask into A register. |
| | OUT STATUS | Output contents of A register which forces Boolean processor logic unit false. |
| | JMP MAIN | Jump to POP H instruction in routine 175. |

APPENDIX B

| COMPONENT | DESCRIPTION |
|---|---|
| RAM 4 | CMOS RAM IM6551 manufactured by Intersil Corporation. |
| UAR/T 12 | Universal Asynchronous Receiver/Transmitter Serial No. 8251 manufactured by Intel Corporation. |
| Gates 13 | SN74125 gates manufactured by Texas Instruments, Inc. |
| I/O address gates 26 | SN74125 gates manufactured by Texas Instruments, Inc. |
| I/O data gates 33 | Peripheral Drivers Serial No. 75450 manufactured by Texas |

APPENDIX B-continued

| COMPONENT | DESCRIPTION |
| --- | --- |
| Microprocessor 40 | Eight-bit, seventy-two-instruction, LSI chip manufctured by Intel Corporation, - Model 8080. |
| ROM 42 | SN74S472 fusible link PROM (512×8) manufactured by Texas Instruments, Inc. |
| Multiplexer 56 | SN74S257 quad two-line-to-one-line data selector/multiplexer manufactured by Texas Instruments, Inc. |
| Clock generator and drive circuit 68 | Clock Generator Serial No. 8224 manufactured by Intel Corporation. |
| Status latches 65 and 66 | SN74116 8-bit latch manufactured by Texas Instruments, Inc. |
| Time delay 80 | SN74123 retriggerable multivibrator manufctured by Texas Instuments, Inc. |
| Bit selector prom 99 | Serial No. 85S123 manufactured by Signetics Corporation. |
| Bit selector circuit 102 | SN74151 eight-line-to-one-line multiplexer manufactured by Texas Instruments, Inc. |
| Instruction decoder proms 120 and 122 | Serial No. 82S129 manufactured by Signetics Corporation. |
| Tri-state gates 90–97 and 104–111 | SN74125 gates manufactured by Texas Instruments, Inc. |
| Bit selector 157 | Data selector/multiplexer Serial No. 74LS151 manufactured by Texas Instruments, Inc. |
| Tri-state gates 153–156, 165 and 166 | SN74125 gates manufactured by Texas Instruments, Inc. |

We claim:

1. A programmable controller comprising:

a memory which stores on selected memory lines an I/O image table comprised of a plurality of multi-bit status words, a plurality of controller instructions which comprise a control program, and a set of machine instructions;

an address bus connected to said memory to select a memory line therein;

a data bus connected to said memory to couple data to and from said memory;

an I/O interface rack coupled to said address bus and said data bus, said I/O interface rack including input and output circuits for coupling the data bus to sensing devices and operating devices on a machine to be controlled;

a microprocessor responsive to selected machine instructions to sequentially read said controller instructions out of said memory, responsive to other selected machine instructions to read selected status words out of said memory, responsive to other machine instructions to write status words into selected memory lines of said I/O image table, and responsive to other machine instructions to couple status words between said I/O image table and associated input and output circuits in said I/O interface rack; and a Boolean processor coupled to said data bus and including:

a. a logic unit having an input and an output and including a first single-bit storage means having an input coupled to the logic unit input and an output coupled to the logic unit output, said logic unit being operable to store a logic state which corresponds to the logic state of a signal coupled to said logic unit input and being operable to couple said stored logic state to said logic unit output;

b. bit pointer means having inputs connected to leads in said data bus and being operable to couple the logic state signal of a selected one of said data bus leads to the input of said logic unit; and c. bit selector means having an input connected to said logic unit output and a plurality of outputs connected to leads in said data bus, said bit selector means being operable in response to a machine instruction executed by said microprocessor to couple the logic state at said logic unit output to one of said leads in said data bus; and in which the logic unit includes a second single-bit storage means having an input coupled to the logic unit input and an output coupled to the input of said first single-bit storage means, first gate means operable when enabled to couple the logic state of said logic input to said first single-bit storage means, second gate means operable when enabled to couple the logic state of said logic unit input to said second single-bit storage means, and third gate means operable when enabled to couple the logic state of said second single-bit storage means output to the input of said first single-bit storage means.

2. The programmable controller as recited in claim 1 in which said Boolean processor includes decoder means connected to receive operation codes within selected ones of the controller instructions read from said memory and is responsive to selective ones of said operation codes to enable said first, second and third gate means in said logic unit.

3. A programmable controller comprising:

a random access memory which stores a plurality of macro-instructions which comprise a control program, each of said macro-instructions including a selected one of a plurality of types of operation codes;

a read-only memory which stores a first set of machine instructions which comprise a macro-instruction decoding routine, and a plurality of sets of machine instructions which comprise macro-instruction execution routines, there being a unique macro-instruction execution routine associated with each type of macro-instruction operation code;

an address bus connected to said random access memory and said read-only memory to select a line therein;

a data bus connected to said random access memory to couple data to and from said random access memory and connected to said read-only memory to couple data from said read-only memory;

an I/O interface rack coupled to said address bus and said data bus, said I/O interface rack including input and output circuits for coupling the data bus to sensing devices and operating devices on a machine to be controlled; and a microprocessor for executing machine instructions, said microprocessor being connected to said data bus and said address bus and having a program counter which stores the memory address of a machine instruction stored in said read-only memory and a stack pointer register which stores the address of a macro-instruction stored in said random access memory, said microprocessor being responsive to selected machine instructions in said macro-instruction decoding routine to read out of said random access memory the macro-instruction addressed by said stack pointer register and being responsive to further selected machine instructions in said macro-instruction decoding routine and the operation code in the macro-instruction read from said random access memory to load the starting address of the macro-instruction execution routine which is associated with said operation code into said program counter.

4. The programmable controller as recited in claim 3 in which an I/O image table comprised of a plurality of multi-bit status words is stored in said random access memory and in which a macro-instruction execution routine associated with an operation code in one of said macro-instructions includes machine instructions which direct said microprocessor to couple data between said I/O image table and said I/O interface rack.

5. The programmable controller as recited in claim 3 in which a mapping table comprised of a list of the starting addresses of all the macro-instruction execution routines is stored in said read-only memory and said microprocessor loads the starting address of the macro-instruction execution routine which is associated with said operation code into said program counter by reading it from said mapping table and coupling it through said data bus to said program counter.

6. The programmable controller as recited in claim 3 in which a Boolean processor is coupled to said microprocessor, said Boolean processor being responsive to selected ones of said macro-instruction operation codes read from said random access memory to perform corresponding logical operations, and said Boolean processor including means for resetting said microprocessor program counter to the starting address of said macro-instruction decoding routine after said Boolean processor performs its logical operation.

7. A programmable controller comprising:
   a memory which stores a plurality of control instructions which comprise a control program, each of said control instructions including an operation code and selected ones of said control instructions including an associated bit pointer;
   a microprocessor connected to said memory through an address bus and a multi-lead data bus, said microprocessor being operable to sequentially read said control instructions out of said memory onto said data bus; and
   a Boolean processor which comprises:
   a. means coupled to said data bus for decoding selected ones of said operation codes,
   b. bit selector means having inputs connected to said data bus and being responsive to the bit pointer in selected ones of said control instructions read from said memory to selectively couple the logic state on one of said data bus leads to a bit selector output terminal,
   c. main decision storage means having an input terminal coupled to said bit selector output terminal, an enable terminal connected to said decoding means and an output terminal, said main decision storage means being responsive to selected decoded operation codes to store a logic state indicative of the logic state of said bit selector output terminal, and
   d. second bit selector means having an input terminal coupled to said main decision storage means output terminal, having a plurality of output terminals coupled to respective leads in said multi-lead data bus, and having an enable terminal coupled to said decoding means, said second bit selector means being responsive to selected decoded operation codes and their associated bit pointer to couple the logic state of said main decision storage means to a selected one of said data bus leads; and
   in which said Boolean processor includes gate means having one input coupled to said main decision storage means, a second input coupled to said microprocessor, and an output terminal connected to one lead in said data bus, said microprocessor being operable to enable said gate means to couple the logic state of said main decision storage means to said one data bus lead.

8. The digital control system as recited in claim 7 in which said Boolean processor includes second gate means having one input terminal coupled to a selected one of said data bus leads, a second input coupled to said processor, and an output coupled to said main decision storage means, said processor being operable to enable said second gate means to couple the logic state of said one data bus lead to said main decision storage means.

9. A digital control system comprising:
   memory means which stores on selected memory lines a plurality of controller instructions which comprise a control program, a plurality of multi-bit status words which comprise an I/O image table, and a set of machine instructions;
   an address bus connected to said memory means to select a memory line therein;
   a multi-lead data bus connected to said memory means to couple data to and from said memory means;
   an I/O interface rack coupled to said address bus and said data bus, said I/O interface rack including input and output circuits for coupling the digital control system to sensing devices and operating devices on a machine to be controlled;
   processor means responsive to selected machine instructions to sequentially read said controller instructions out of said memory means, responsive to other selected machine instructions to read selected status words out of said I/O image table, responsive to other selected machine instructions to write status words into selected memory lines of said I/O image table, and responsive to other machine instructions to couple status words between said I/O image table and said I/O interface rack; and
   a Boolean processor coupled to said data bus and said processor means, said Boolean processor being responsive to control signals from said processor means to perform a set of single-bit calculations on selected status bits in said I/O image table which are coupled to it through said multi-lead data bus, and which are to generate a single-bit result on a selected lead in said multi-lead data bus, which result is coupled to said I/O image table.

10. The digital control system as recited in claim 9 in which said Boolean processor includes a set of terminals for receiving a bit pointer code contained in selected ones of said controller instructions and said Boolean processor is responsive to a bit pointer code received at said set of terminals to select one of the leads in said multi-lead data bus.

* * * * *